United States Patent
Schoolcraft

(10) Patent No.: US 9,772,017 B2
(45) Date of Patent: Sep. 26, 2017

(54) SPLIT POWER INFINITELY VARIABLE TRANSMISSION ARCHITECTURE INCORPORATING A PLANETARY TYPE BALL VARIATOR WITH LOW VARIATOR LOADING AT VEHICLE LAUNCH

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/517,400

(22) Filed: Oct. 17, 2014

(65) Prior Publication Data
US 2016/0109005 A1    Apr. 21, 2016

(51) Int. Cl.
  F16H 3/66    (2006.01)
  F16H 37/08   (2006.01)
  F16H 15/28   (2006.01)

(52) U.S. Cl.
  CPC ........... *F16H 37/086* (2013.01); *F16H 3/666* (2013.01); *F16H 15/28* (2013.01); *F16H 2037/0873* (2013.01); *F16H 2037/0893* (2013.01); *F16H 2200/2012* (2013.01); *F16H 2200/2041* (2013.01); *F16H 2200/2043* (2013.01); *F16H 2200/2097* (2013.01)

(58) Field of Classification Search
  CPC .................. F16H 37/086; F16H 2200/2041
  See application file for complete search history.

(56) References Cited

U.S. PATENT DOCUMENTS

| 2,347,873 A | 5/1944 | Bloomfield |
| 2,410,818 A | 11/1946 | Grant |
| 2,554,221 A | 5/1951 | Stephenson et al. |
| 2,583,843 A | 1/1952 | Herrick |
| 2,596,654 A | 5/1952 | Clark et al. |
| 2,718,292 A | 9/1955 | Meilander et al. |

(Continued)

FOREIGN PATENT DOCUMENTS

| DE | 102007013493 A1 | 9/2008 |
| DE | 102012216277 A1 | 3/2014 |

(Continued)

OTHER PUBLICATIONS

International Search Report and Written Opinion received for PCT International Application No. PCT/US2013/045580, Oct. 27, 2013, 3 pages.

(Continued)

*Primary Examiner* — Jacob S Scott
*Assistant Examiner* — Tinh Dang
(74) *Attorney, Agent, or Firm* — Barnes & Thornburg LLP

(57) ABSTRACT

A transmission includes an input shaft, an output shaft, at least four planetary gearsets, a variable-ratio unit, and at least four clutches. The input shaft is configured to receive torque from a drive unit. The output shaft is configured to transmit torque to a load. The at least four planetary gearsets, the variable-ratio unit, and the at least four clutches are arranged between the input shaft and the output shaft. The at least four clutches are selectively engageable in combination with one another to select one of at least four operating modes.

17 Claims, 16 Drawing Sheets

(56) References Cited

U.S. PATENT DOCUMENTS

| | | |
|---|---|---|
| 2,841,330 A | 7/1958 | Brewer et al. |
| 3,324,744 A | 6/1967 | Roper |
| 3,410,157 A | 11/1968 | Livezey |
| 3,432,016 A | 3/1969 | Vogt |
| 3,481,436 A | 12/1969 | Wilkowski |
| 3,631,741 A | 1/1972 | Kelbel |
| 4,004,473 A | 1/1977 | Pearce et al. |
| 4,107,776 A | 8/1978 | Beale |
| 4,114,478 A | 9/1978 | Clauss |
| 4,205,563 A | 6/1980 | Gorrell |
| 4,258,585 A | 3/1981 | Orshansky, Jr. et al. |
| 4,361,217 A | 11/1982 | Bieber et al. |
| 4,381,828 A | 5/1983 | Lunn et al. |
| 4,742,733 A | 5/1988 | Schreiner |
| 4,754,664 A | 7/1988 | Dick |
| 4,813,524 A | 3/1989 | Reik |
| 4,856,374 A | 8/1989 | Kreuzer |
| 4,950,208 A | 8/1990 | Tomlinson |
| 5,011,463 A | 4/1991 | Jarchow et al. |
| 5,062,050 A | 10/1991 | Petzold et al. |
| 5,152,726 A | 10/1992 | Lederman |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Weilant et al. |
| 5,653,322 A | 8/1997 | Vasa et al. |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,301,538 B1 | 10/2001 | Kirchhoffer et al. |
| 6,358,178 B1 | 3/2002 | Wittkopp |
| 6,394,925 B1* | 5/2002 | Wontner .................. F16H 47/04 475/80 |
| 6,460,671 B1 | 10/2002 | Karambelas et al. |
| 6,585,619 B2 | 7/2003 | Henzler |
| 6,588,559 B2 | 7/2003 | Blair |
| 6,672,442 B2 | 1/2004 | Kato et al. |
| 6,679,367 B2 | 1/2004 | Baker et al. |
| 6,719,659 B2 | 4/2004 | Geiberger et al. |
| 6,726,590 B2 | 4/2004 | Henzler et al. |
| 6,761,658 B1 | 7/2004 | Stettler, Jr. |
| 6,790,153 B2 | 9/2004 | Goto |
| 6,834,750 B2 | 12/2004 | Baker et al. |
| 6,846,257 B2 | 1/2005 | Baker et al. |
| 6,855,086 B2 | 2/2005 | Elser et al. |
| 6,949,045 B2 | 9/2005 | Wafzig et al. |
| 7,052,430 B2 | 5/2006 | Stevenson et al. |
| 7,189,182 B2 | 3/2007 | Stevenson et al. |
| 7,195,576 B2 | 3/2007 | Toyoda et al. |
| 7,204,337 B2 | 4/2007 | Wildfellner |
| 7,217,216 B2 | 5/2007 | Inoue |
| 7,219,569 B2 | 5/2007 | Jastrzembowski et al. |
| 7,326,146 B2 | 2/2008 | Miyata et al. |
| 7,347,801 B2 | 3/2008 | Guenter et al. |
| 7,407,459 B2 | 8/2008 | Greenwood et al. |
| 8,083,631 B2 | 12/2011 | Shiohara |
| 8,142,323 B2 | 3/2012 | Tsuchiya et al. |
| 8,152,673 B2 | 4/2012 | Yanay |
| 8,298,111 B2 | 10/2012 | Kato et al. |
| 8,298,112 B2 | 10/2012 | Takada |
| 8,617,020 B2 | 12/2013 | Winter |
| 8,758,181 B2* | 6/2014 | Calvert ........................ 475/73 |
| 8,845,477 B2 | 9/2014 | Koch et al. |
| 8,986,150 B2 | 3/2015 | Versteyhe et al. |
| 8,996,263 B2 | 3/2015 | Quinn, Jr. et al. |
| 9,133,924 B2 | 9/2015 | Schoolcraft |
| 9,163,705 B1 | 10/2015 | Hwang et al. |
| 9,285,015 B2* | 3/2016 | Akerblom ............... F16H 47/04 |
| 2002/0005325 A1 | 1/2002 | Yamada |
| 2003/0051959 A1 | 3/2003 | Blair |
| 2003/0199353 A1 | 10/2003 | Bowen |
| 2003/0226415 A1 | 12/2003 | Baker et al. |
| 2004/0104096 A1 | 6/2004 | Genise |
| 2006/0025272 A1 | 2/2006 | Pelouch |
| 2006/0189435 A1 | 8/2006 | Flaig et al. |
| 2007/0272455 A1 | 11/2007 | Lang et al. |
| 2007/0287572 A1 | 12/2007 | Tabata et al. |
| 2008/0280722 A1 | 11/2008 | Phillips et al. |
| 2009/0118912 A1 | 5/2009 | Hugenroth et al. |
| 2009/0203486 A1 | 8/2009 | Murray |
| 2009/0253543 A1 | 10/2009 | Foster et al. |
| 2010/0093479 A1 | 4/2010 | Carter et al. |
| 2010/0151984 A1 | 6/2010 | Viitasalo et al. |
| 2011/0111910 A1 | 5/2011 | Ideshio et al. |
| 2011/0144872 A1 | 6/2011 | Long et al. |
| 2011/0300983 A1 | 12/2011 | Kurokawa |
| 2012/0072084 A1 | 3/2012 | Stoller et al. |
| 2013/0018557 A1 | 1/2013 | Wilson et al. |
| 2013/0338888 A1 | 12/2013 | Long et al. |
| 2013/0338889 A1 | 12/2013 | Long et al. |
| 2013/0338893 A1 | 12/2013 | Long et al. |
| 2014/0038766 A1 | 2/2014 | Koch et al. |
| 2014/0262672 A1* | 9/2014 | Raszkowski ............ F16D 11/14 192/69.8 |
| 2014/0274540 A1* | 9/2014 | Schoolcraft ........... F16H 37/086 475/219 |

FOREIGN PATENT DOCUMENTS

| | | |
|---|---|---|
| EP | 1519084 A2 | 9/2004 |
| EP | 2113056 A1 | 11/2009 |
| JP | 2007232125 A | 9/2007 |
| JP | 2008075706 A | 4/2008 |
| WO | 9849455 A2 | 11/1998 |
| WO | 2010048029 A2 | 4/2010 |
| WO | 2014039900 | 3/2014 |
| WO | 2014125050 | 8/2014 |

OTHER PUBLICATIONS

U.S. Appl. No. 61/660,666, dated Dec. 16, 2009, (31 pages).
Utility U.S. Appl. No. 14/517,364, dated Oct. 17, 2014.
Utility U.S. Appl. No. 14/517,374, dated Oct. 17, 2014.
Utility U.S. Appl. No. 14/517,380, dated Oct. 17, 2014.
Utility U.S. Appl. No. 14/517,410, dated Oct. 17, 2014.
Utility U.S. Appl. No. 14/517,426, dated Oct. 17, 2014.
Search Report and Written Opinion from the International Searching Authority for Application No. PCT/US2015/056009, dated Feb. 25, 2016, 13 pages.
Search Report and Written Opinion for Application No. PCT/US2015/055999, dated Dec. 4, 2015, 10 pages.
Search Report and Written Opinion for Application No. PCT/US2015/055996, dated Jan. 4, 2016, 7 pages.
Search Report and Written Opinion for Application No. PCT/US2015/055993, dated Jan. 6, 2016, 8 pages.
Search Report and Written Opinion for Application No. PCT/US2015/056003, dated Jan. 6, 2016, 8 pages.
Search Report and Written Opinion for Application No. PCT/US2015/056007, dated Jan. 28, 2016, 8 pages.

* cited by examiner

| REGIME | CLUTCHES APPLIED | | | | | TRANSMISSION RATIO IN MODE | | | REGIME SHOWN IN FIG. |
|---|---|---|---|---|---|---|---|---|---|
| | C1 | C2 | C3 | C4 | C5 | MIN | FIXED | MAX | |
| MODE 1 | X | | | | | -0.232 | | 0.000 | 6 |
| BYPASS 1 | X | | | | X | | -0.125 | | 7 |
| SYNC 1-2 | X | X | | | | | 0.000 | | 8 |
| MODE 2 | | X | | | | 0.000 | | 0.247 | 9 |
| BYPASS 2 | | X | | | X | | 0.132 | | 10 |
| SYNC 2-3 | | X | X | | | | 0.247 | | 11 |
| MODE 3 | | | X | | | 0.247 | | 1.000 | 12 |
| BYPASS 3 | | | X | | X | | 0.596 | | 13 |
| SYNC 3-4 | | | X | X | | | 1.000 | | 14 |
| MODE 4 | | | | X | | 1.000 | | 1.800 | 15 |
| BYPASS 4 | | | | X | X | | 1.430 | | 16 |

FIG. 5

SPLIT POWER INFINITELY VARIABLE TRANSMISSION ARCHITECTURE INCORPORATING A PLANETARY TYPE BALL VARIATOR WITH LOW VARIATOR LOADING AT VEHICLE LAUNCH

TECHNICAL FIELD

The present disclosure relates generally to infinitely variable transmissions, and more particularly, to the architectures of infinitely variable transmissions including ratio varying units.

BACKGROUND

Continuously variable transmissions (CVTs) utilize a ratio varying unit (e.g., a "variator") to provide a continuous variation of transmission ratio rather than a series of predetermined ratios as provided in typical transmissions. The variator of a typical CVT is coupled between the transmission input and the transmission output via gearing and one or more clutches.

In one type of continuously variable transmission, referred to as an infinitely variable transmission (IVT), a zero output speed can be obtained independently of the rotational input speed provided to the transmission by the drive unit in a geared neutral mode. Infinitely variable transmissions may use a variator and a planetary gear train to direct power flow along multiple power paths. For instance, power may flow along a first path through the variator and along a second path through the planetary gear train. Power may also be recirculated to the variator, thereby increasing the load experienced by the variator during the operation of the infinitely variable transmission. Many current architectures for infinitely variable transmissions subject the variator to the entire power load recirculated through the infinitely variable transmission.

SUMMARY

According to one aspect of the present disclosure, a transmission includes an input shaft, an output shaft, at least four planetary gearsets arranged between the input shaft and the output shaft, a variable-ratio unit arranged between the input shaft and the output shaft, and at least four clutches arranged between the input shaft and the output shaft. The input shaft is configured to receive torque from a drive unit. The output shaft is configured to transmit torque to a load. The at least four clutches are selectively engageable in combination with one another to select one of at least four operating modes.

In some embodiments, (i) the at least four planetary gearsets may include only four planetary gearsets, and (ii) the at least four clutches may include only four clutches. The at least four operating modes may include only four operating modes. The transmission may be configured to receive a first plurality of input speeds at the input shaft and provide a second plurality of output speeds at the output shaft, and the four operating modes may include a first mode in which one of the second plurality of output speeds is equal to zero for the first plurality of input speeds and a second mode in which one of the second plurality of output speeds is equal to zero for the first plurality of input speeds. The transmission may be configured to provide (i) a range of negative speed ratios between the input shaft and the output shaft in the first mode, and (ii) a range of positive speed ratios between the input shaft and the output shaft in the second mode. Additionally, in some embodiments, the at least four operating modes may include only seven operating modes.

In some embodiments, the transmission may further include a housing, the at least four planetary gearsets may include a first planetary gearset coupled to the input shaft and a second planetary gearset coupled to the housing, and the at least four clutches may include a first clutch engageable to selectively couple a first element of the first planetary gearset to a first element of the second planetary gearset. The at least four clutches may include a second clutch engageable to selectively couple the first element of the first planetary gearset to a second element of the second planetary gearset. The at least four planetary gearsets may include a third planetary gearset coupled to the housing, the at least four clutches may include a third clutch engageable to selectively couple a first element of the third planetary gearset to the first element of the second planetary gearset, and the at least four clutches may include a fourth clutch engageable to selectively couple the first element of the third planetary gearset to the second element of the second planetary gearset.

According to another aspect of the present disclosure, a transmission includes a housing, an input shaft, an output shaft, a variable-ratio unit arranged between the input shaft and the output shaft, at least four planetary gearsets arranged between the input shaft and the output shaft, and at least four clutches arranged between the input shaft and the output shaft. The input shaft is configured to receive torque from a drive unit. The output shaft is configured to transmit torque to a load. The variable-ratio unit is configured to output torque from an input of the variable-ratio unit to an output of the variable-ratio unit. The at least four planetary gearsets include (i) a first planetary gearset coupled to the input shaft and the variable-ratio unit and (ii) a second planetary gearset coupled to the first planetary gearset, the variable-ratio unit, and the housing. The at least four clutches are selectively engageable in combination with one another to select one of at least four operating modes.

In some embodiments, each of the first and second planetary gearsets may include an idler gear. In some embodiments, (i) a ring gear of the first planetary gearset may be coupled to the input shaft, and (ii) a carrier of the first planetary gearset may be coupled to the input of the variable-ratio unit. Additionally, in some embodiments, (i) a ring gear of the second planetary gearset may be coupled to a sun gear of the first planetary gearset, (ii) a sun gear of the second planetary gearset may be coupled to the output of the variable-ratio unit, and (iii) a carrier of the second planetary gearset may be coupled to the housing.

In some embodiments, (i) the at least four planetary gearsets may include a third planetary gearset coupled to the housing, and (ii) the at least four clutches may include a first clutch engageable to selectively couple a carrier of the first planetary gearset to a carrier of the third planetary gearset. The at least four clutches may include a second clutch engageable to selectively couple the carrier of the first planetary gearset to a sun gear of the third planetary gearset. The at least four clutches may include a third clutch engageable to selectively couple a ring gear of the second planetary gearset to the carrier of the third planetary gearset. The at least four clutches may include a fourth clutch engageable to selectively couple the ring gear of the second planetary gearset to the sun gear of the third planetary gearset.

In some embodiments, the transmission may be operable to engage only one of the at least four clutches in each of the at least four operating modes.

According to another aspect of the present disclosure, a transmission includes a housing, an input shaft, an output shaft, a variable-ratio unit arranged between the input shaft and the output shaft, at least four planetary gearsets arranged between the input shaft and the output shaft, and at least four clutches arranged between the input shaft and the output shaft. The input shaft is configured to receive torque from a drive unit. The output shaft is configured to transmit torque to a load. The at least four planetary gearsets include (i) a first planetary gearset coupled to the input shaft and the variable-ratio unit and (ii) a second planetary gearset coupled to the first planetary gearset, the variable-ratio unit, and the housing. The at least four clutches are selectively engageable in combination with one another to select one of at least four operating modes. The at least four clutches include (i) a first pair of clutches engageable in combination with one another to couple a first element of the second planetary gearset to a first element of the first planetary gearset in one of the at least four operating modes and (ii) a second pair of clutches engageable in combination with one another to couple the first element of the second planetary gearset to the first element of the first planetary gearset in another of the at least four operating modes.

According to another aspect of the present disclosure, a transmission is operable in a plurality of operating modes and comprises an input shaft, a plurality of planetary gearsets, a variable-ratio unit, and a plurality of torque-transmitting mechanisms. The input shaft is configured to receive torque from a drive unit and transmit the torque to an output shaft of the transmission. The plurality of planetary gearsets is arranged between the input shaft and the output shaft, and the plurality of planetary gearsets includes a first planetary gearset and a second planetary gearset. Each of the planetary gearsets includes a sun gear, a ring gear, a carrier, and a plurality of planet gears. The variable-ratio unit is operable to produce continuously-variable torque output. The plurality of torque transmitting mechanisms includes a variator bypass clutch, a first clutch, and a second clutch. The variator bypass clutch is engageable to bypass the variable-ratio unit to prevent continuously-variable torque output from being produced in at least one operating mode of the transmission. The first clutch is engageable to couple the ring gear of the first planetary gearset to the carrier of the second planetary gearset. The second clutch is engageable to couple the ring gear of the first planetary gearset to the sun gear of the second planetary gearset.

In some embodiments, the variable-ratio unit may include an input ring and an output ring. The input ring may be coupled to the carrier of a third planetary gearset. The output ring may be coupled to the sun gear of the first planetary gearset. The variator bypass clutch may be engageable to couple the input ring of the variable-ratio unit to the output ring of the variable-ratio unit so that the carrier of the third planetary gearset is coupled to the sun gear of the first planetary gearset.

In some embodiments, at least one of the first, second, and third planetary gearsets may include an idler-planet gear. At least two of the first, second, and third planetary gearsets may each include an idler-planet gear.

In some embodiments, the plurality of torque transmitting mechanisms may include a third clutch. The third clutch may be engageable to couple the carrier of the third planetary gearset to the sun gear of the second planetary gearset.

In some embodiments, the transmission may be operable in at least four operating modes to output torque at a ratio varying within a defined range. The transmission may be operable in at least seven operating modes to output torque at a fixed ratio.

According to another aspect of the present disclosure, a transmission is operable in a plurality of operating modes and comprises an input shaft, a plurality of planetary gearsets, a variable-ratio unit, and a plurality of torque transmitting mechanisms. The input shaft is configured to receive torque from a drive unit and transmit the torque to an output shaft of the transmission. The plurality of planetary gearsets is arranged between the input shaft and the output shaft. The plurality of planetary gearsets includes a first planetary gearset, a second planetary gearset, and a third planetary gearset. Each of the planetary gearsets includes a sun gear, a ring gear, a carrier, and a plurality of planet gears. The variable-ratio unit is operable to produce continuously-variable torque output. The plurality of torque transmitting mechanisms includes a variator bypass clutch, a first clutch, a second clutch, and a third clutch. The variator bypass clutch is engageable to bypass the variable-ratio unit to prevent continuously-variable torque output from being produced in at least one operating mode of the transmission. The first clutch is engageable to couple the ring gear of the first planetary gearset to the carrier of the second planetary gearset. The second clutch is engageable to couple ring gear of the first planetary gearset to the sun gear of the second planetary gearset. The third clutch is engageable to couple the carrier of the third planetary gearset to the carrier of the second planetary gearset.

In some embodiments, the plurality of torque transmitting mechanisms may include a fourth clutch. The fourth clutch may be engageable to couple the carrier of the third planetary gearset to the sun gear of the second planetary gearset. The sun gear of the third planetary gearset may be coupled to the ring gear of the first planetary gearset.

In some embodiments, the variable-ratio unit may include an input ring and an output ring. The input ring may be coupled to the carrier of the third planetary gearset. The output ring may be coupled to the sun gear of the first planetary gearset. The variator bypass clutch may be engageable to couple the input ring of the variable-ratio unit to the output ring of the variable-ratio unit so that the carrier of the third planetary gearset is coupled to the sun gear of the first planetary gearset.

In some embodiments, at least one of the first, second, and third planetary gearsets may include at least one idler-planet gear. At least two of the first, second, and third planetary gearsets may each include at least one idler-planet gear.

According to another aspect of the present disclosure, a transmission is operable in a plurality of operating modes and comprises an input shaft, a plurality of planetary gearsets, a variable-ratio unit, and a plurality of torque transmitting mechanisms. The input shaft is configured to receive torque from a drive unit and transmit the torque to an output shaft of the transmission. The plurality of planetary gearsets is arranged between the input shaft and the output shaft. The plurality of planetary gearsets includes a first planetary gearset, a second planetary gearset, a third planetary gearset, and a fourth planetary gearset. Each of the planetary gearsets includes a sun gear, a ring gear, a carrier, and a plurality of planet gears. The variable-ratio unit is operable to produce continuously-variable torque output. The plurality of torque transmitting mechanisms includes a first clutch, a second clutch, and a third clutch. The first clutch is engageable to couple the ring gear of the first planetary gearset to the carrier of the second planetary gearset. The second clutch is engageable to couple ring gear of the first planetary gearset to the sun gear of the second planetary gearset. The third clutch is engageable to couple the carrier of the third planetary gearset to the carrier of the second planetary gearset and the carrier of the fourth planetary gearset.

In some embodiments, the plurality of torque transmitting mechanisms may include a fourth clutch. The fourth clutch may be engageable to couple the carrier of the third planetary gearset to the sun gear of the second planetary gearset. The carrier of the second planetary gearset may be coupled to the carrier of the fourth planetary gearset. The first clutch may be engageable to couple the ring gear of the first planetary gearset to the carrier of the fourth planetary gearset through the carrier of the second planetary gearset. The sun gear of the fourth planetary gearset may be coupled to the ring gear of the third planetary gearset. Each component of at least two of each of the first, second, third, and fourth planetary gearsets may be configured to rotate.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a table showing the various operating modes achievable by the infinitely variable transmission of FIG. 1 and the transmission ratios associated with each mode;

DETAILED DESCRIPTION OF THE DRAWINGS

Figure 1:
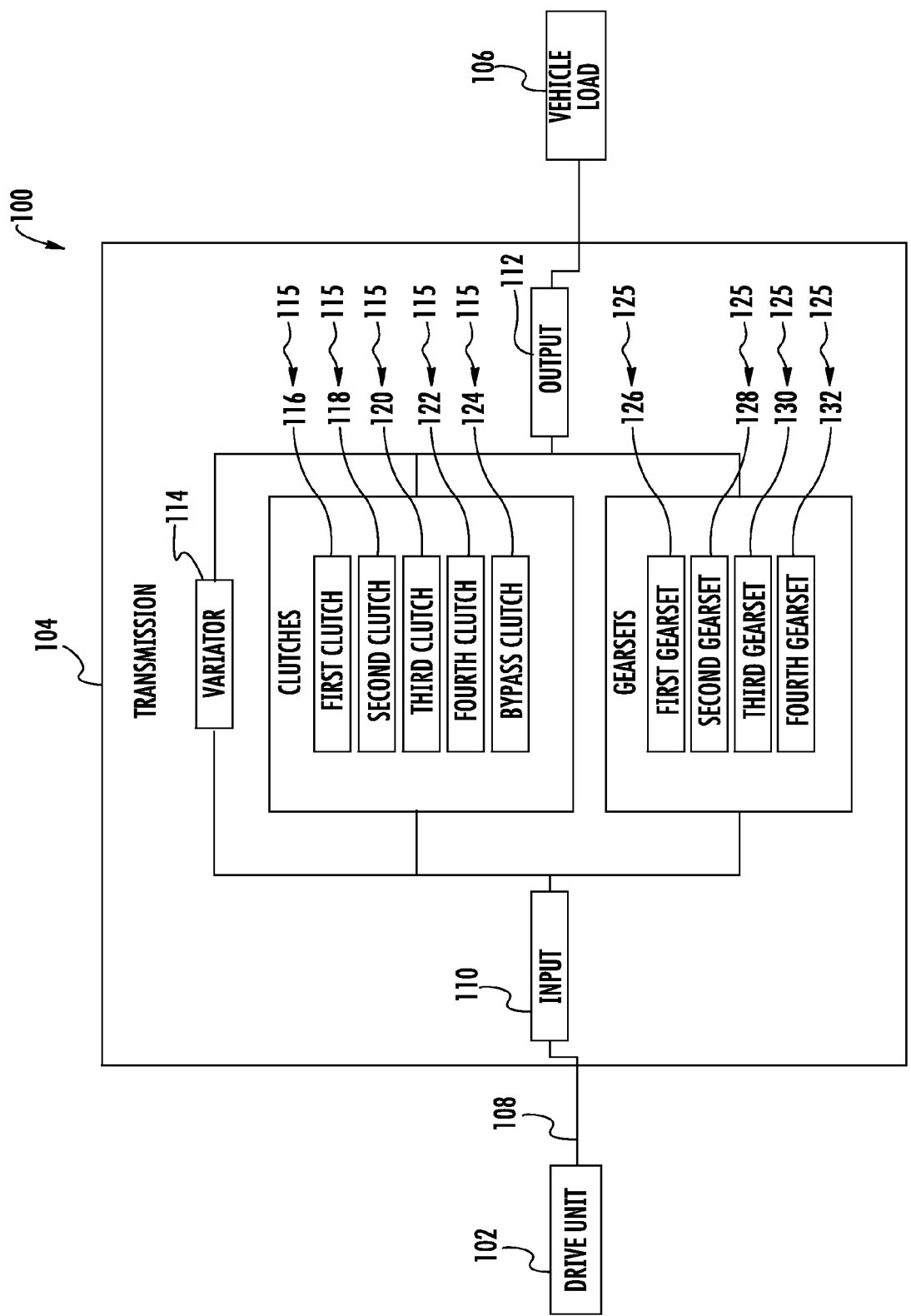
FIG. 1 is a simplified block diagram of an infinitely variable transmission including a variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 104. Additionally, the vehicle load 106 may be embodied as an auxiliary gearbox (e.g. a transfer case or drop box) or a power take-off device, such as a pump, mixer, lifter, shoveler, compressor, compactor, or blower.

In use, rotational power generated by the drive unit 102 is transmitted to the transmission 104 via a drive unit output shaft 108 included in the drive unit 102. The drive unit output shaft 108 is coupled to a transmission input shaft 110 included in the transmission 104. Additionally, rotational power received by the transmission 104 at the input shaft 110 is transmitted to a transmission output shaft 112 and therefrom to the vehicle load 106.

The transmission 104 ensures the controlled application of rotational power generated by the drive unit 102 to the vehicle load 106. The transmission 104, as discussed below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 110 to the transmission output shaft 112. Each operating mode enables at least one ratio of input speed (i.e., at the transmission input shaft 110) to output speed (i.e., at the transmission output shaft 112) to be achieved. As discussed below, operating modes of the transmission 104 in which a variator 114 is utilized enable a range of transmission ratios to be achieved whereas operating modes in which the variator 114 is not utilized enable only a single transmission ratio to be achieved.

The transmission 104 of FIG. 1 is illustratively embodied as an infinitely variable transmission. The transmission 104 includes the variator 114, a plurality of clutches 115, and a plurality of gearsets 125 in addition to the input shaft 110 and the output shaft 112. The plurality of clutches 115 includes a first clutch 116, a second clutch 118, a third clutch 120, a fourth clutch 122, and a variator bypass clutch 124. The plurality of gearsets 125 includes a first gearset 126, a second gearset 128, a third gearset 130, and a fourth gearset 132.

The infinitely variable transmission 104 is operable, as discussed below, to transmit rotational power supplied from the drive unit 102 between the variator 114 and the plurality of gearsets. The transmission 104 is also operable, in at least one operating mode, to achieve zero output speed at the output shaft 112 in a mode referred herein to as a "geared neutral mode." The transmission 104 is further operable to recirculate rotational power directed toward the output shaft 112 back toward the input shaft 110 in multiple operating modes. As discussed below, power recirculated back toward the input shaft 110 and received by the variator 114 is reduced as a result of the architecture of the infinitely variable transmission 104. In this manner, the infinitely variable transmission 104 is similar to the infinitely variable transmission disclosed in U.S. Provisional Patent App. Ser. No. 61/798,476 entitled "SPLIT POWER INFINITELY VARIABLE TRANSMISSION ARCHITECTURE" by Brian Schoolcraft, the entirety of which is hereby incorporated by reference.

The variator 114, the plurality of clutches 115, and the plurality of gearsets 125 included in the transmission 104 are arranged between the input shaft 110 and the output shaft 112 of the transmission 104. Each of the gearsets included in the plurality of gearsets 125 may be supported by a mainshaft of the transmission 104 and may be capable of rotating freely and independently thereof. Each of the clutches may be selectively engaged to transmit power along a particular path between components included in the transmission 104 as discussed below.

Each of the plurality of clutches 115 included in the transmission 104 is embodied as a torque-transmitting device configured to define a torque transfer path between components included in the transmission 104. By selectively engaging each of the plurality of clutches 115 in combination with one another, the plurality of clutches 115 define a torque transfer path between the input shaft 110 and the output shaft 112 and thereby effect a change from one operating mode to another. In one example, one or more of the plurality of clutches 115 may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches 115 may be embodied as multi-plate wet clutches or controllable mechanical diodes, the engagement/disengagement of which are used to accomplish changes between operating modes. As discussed below, in the illustrative embodiment, each of the first clutch 116, the second clutch 118, the third clutch 120, the fourth clutch 122, and the variator bypass clutch 124 is a rotating clutch. Additionally, the variator bypass clutch 124, as discussed below, is engageable to lock a variator input ring 134 to a variator output ring 138 so that the variator 114 achieves a 1:1 ratio (i.e., variator input speed is equal to variator output speed). When the variator bypass clutch 124 is engaged, the power load experienced by the variator 114 is removed, and all the power transmitted to the variator 114 flows instead through the variator bypass clutch 124.

Figure 2:
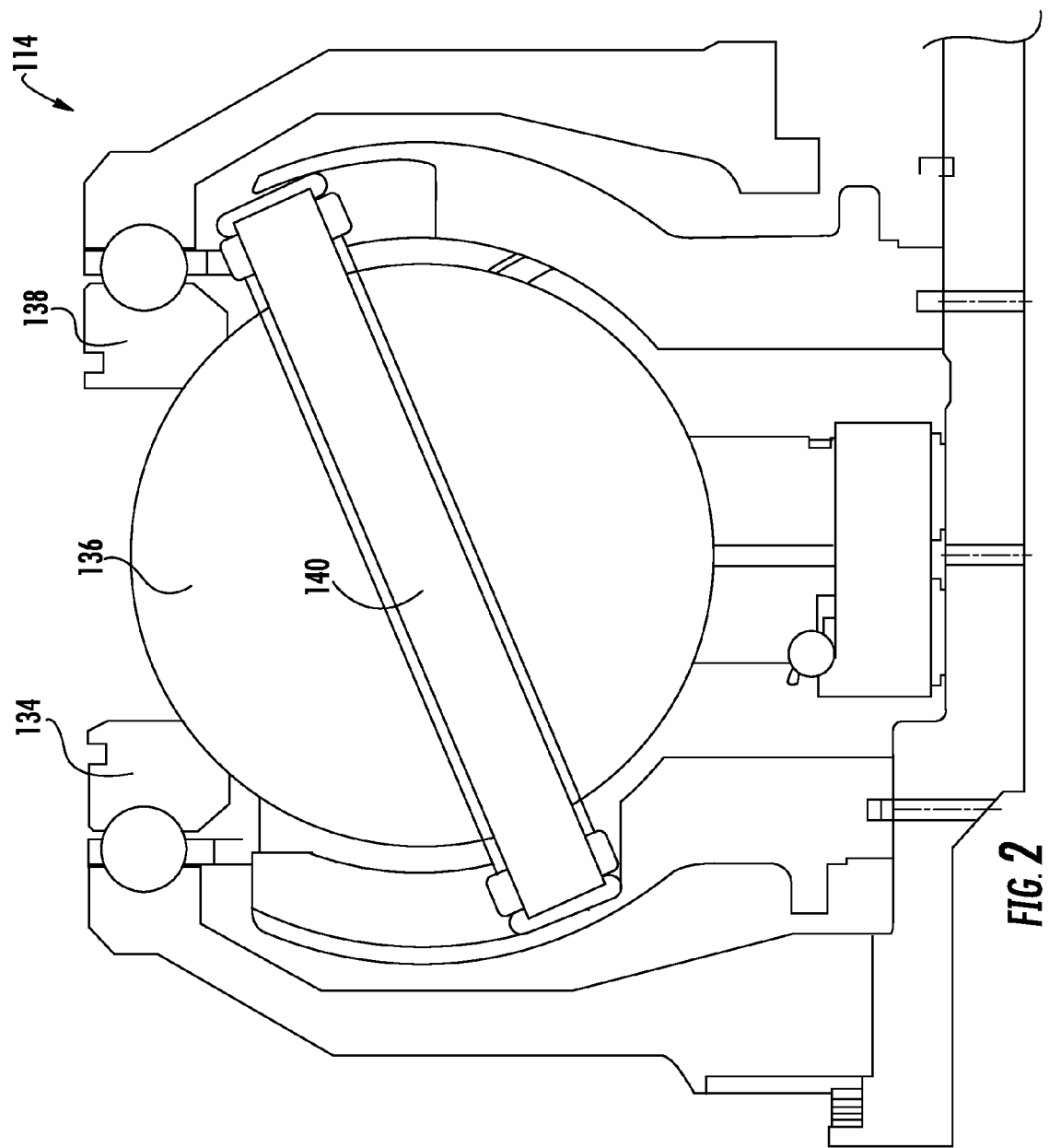
FIG. 2 is a side elevation view of the variator of the infinitely variable transmission of FIG. 1.

Referring now to FIG. 2, in the illustrative embodiment, the variator 114 is embodied as a planetary-type ball variator and includes the input ring 134 and the output ring 138. Each of the variator rings 134, 138 are spaced apart as shown in FIG. 2 to permit a ball 136 to be positioned between the rings 134, 138. The ball 136 is configured to tilt between the rings 134, 138 to vary the ratio achieved using the variator 114. An axle 140 encircles the ball 136 as shown in FIG. 2. The ball 136 is tilted by continuously tilting the axle 140 so that continuously-variable torque output is produced using the variator 114.

Figure 3:
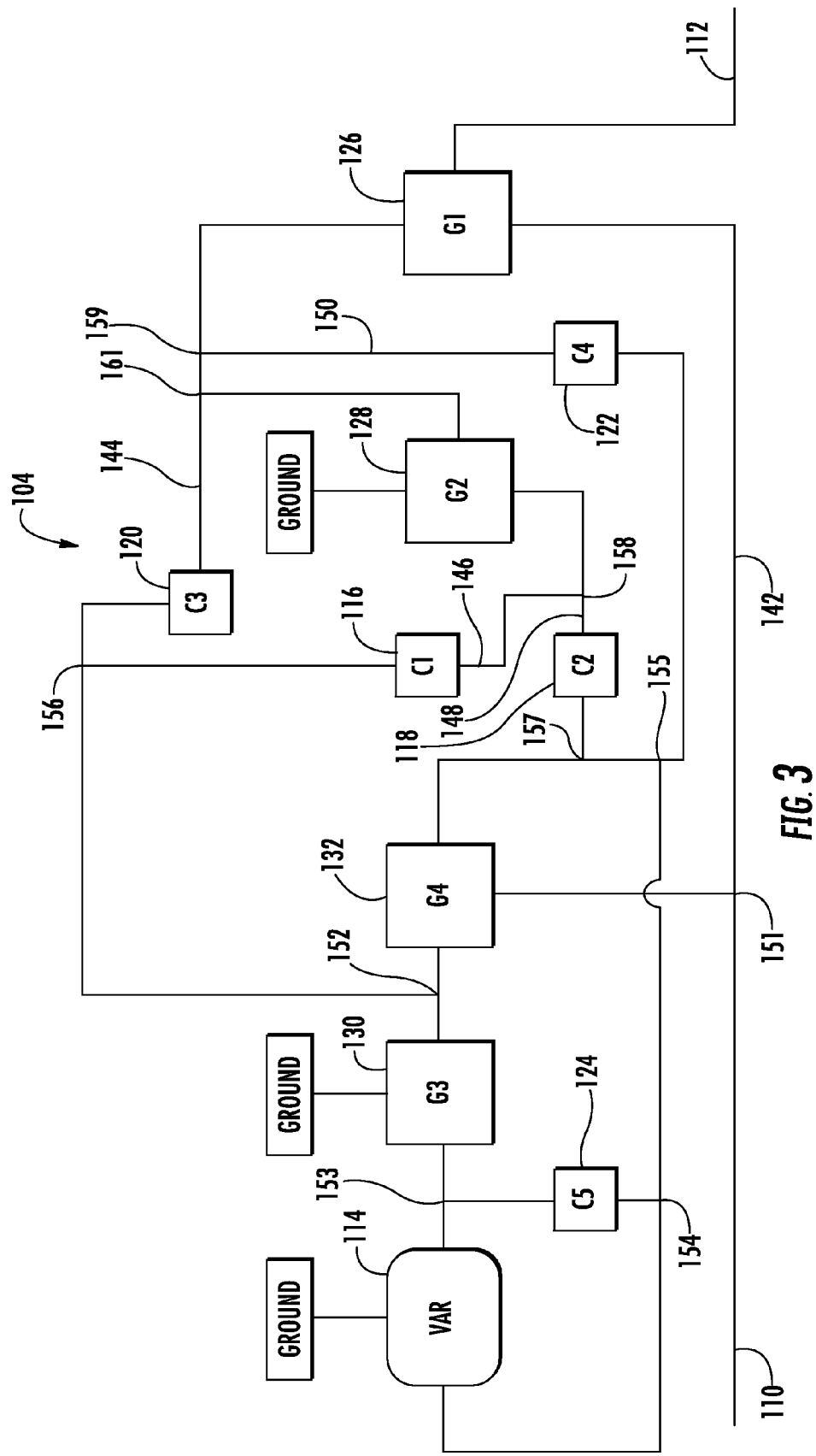
FIG. 3 is a block diagrammatic view of the architecture of the infinitely variable transmission of FIG. 1 showing various components included in the infinitely variable transmission.

Referring now to FIG. 3, the architecture of the transmission 104 is shown in which each of the gearset of the plurality of gearsets 125 is represented by a corresponding box (i.e., G1, G2, G3, and G4) and the variator 114 is designated as "VAR." G1 designates the first gearset 126, G2 designates the second gearset 128, G3 designates the third gearset 130, and G4 designates the fourth gearset 132. Each clutch of the plurality of clutches 125 is also represented by a box such that the following designations apply: Cl (the first clutch 116), C2 (the second clutch 118), C3 (the third clutch 120), C4 (the fourth clutch 122), and C5 (the variator bypass clutch 124).

It should be appreciated that the architecture of the transmission 104 defines a plurality of power paths along which power may be transmitted between components included in the transmission 104 during one or more operational modes. In the illustrative embodiment, the plurality of power paths defined by the architecture of the transmission 104 includes a power path 142, a power path 144, a power path 146, a power path 148, and a power path 150. As illustrated in FIGS. 6-16, power flow along the power path 142 is bi-directional in the plurality of operating modes of the transmission 104. In each operating mode of the transmission 104, power is transmitted between the input shaft 110 and the output shaft 112 along the power path 142 and at least one of the power paths 144, 146, 148, 150.

In the illustrative embodiment, the power path 142 is defined by a junction 151 and the first gearset 126. The input side of the power path 142 is defined at the junction 151. The junction 151 may be embodied as a coupling permitting power received by the input shaft 110 to be transmitted along the power path 142 and toward the first gearset 126. The junction 151 also permits power received by the input shaft 110 to be transmitted toward or away from the fourth gearset 132 along the power path 142. As such, power may be transmitted along the power path 142 from the junction 151 to the first gearset 126, and power transmitted to the first gearset 126 may be transmitted thereafter to the output shaft 112 and/or recirculated toward the junction 151 along the power path 142 or one of the power paths 144, 146, 148, 150.

As illustrated in FIGS. 6-16, the first gearset 126 is a "mixing" planetary gearset that allows power transmitted thereto to be transmitted to the output shaft 112 and/or recirculated back toward the input shaft 110 along the power path 142 or one of the power paths 144, 146, 148, 150. Each component of the first gearset 126 (i.e., each of a sun gear, a carrier, a ring gear, and a plurality of planet gears included in the first gearset 126 as described in more detail below) rotates and is configured to transmit power (i.e., no component of the first gearset 126 is grounded).

The power path 142 utilizes a "fixed" and a "variable" sub-path to transmit power. Power transmitted along a "fixed" sub-path is transmitted at a fixed mechanical ratio. Conversely, power transmitted along a "variable" sub-path is transmitted over a continuously-variable ratio range, i.e., embodied as power is transmitted through the variator 114. The "fixed" and "variable" sub-paths of the power path 142 are described in more detail below.

Figure 6:
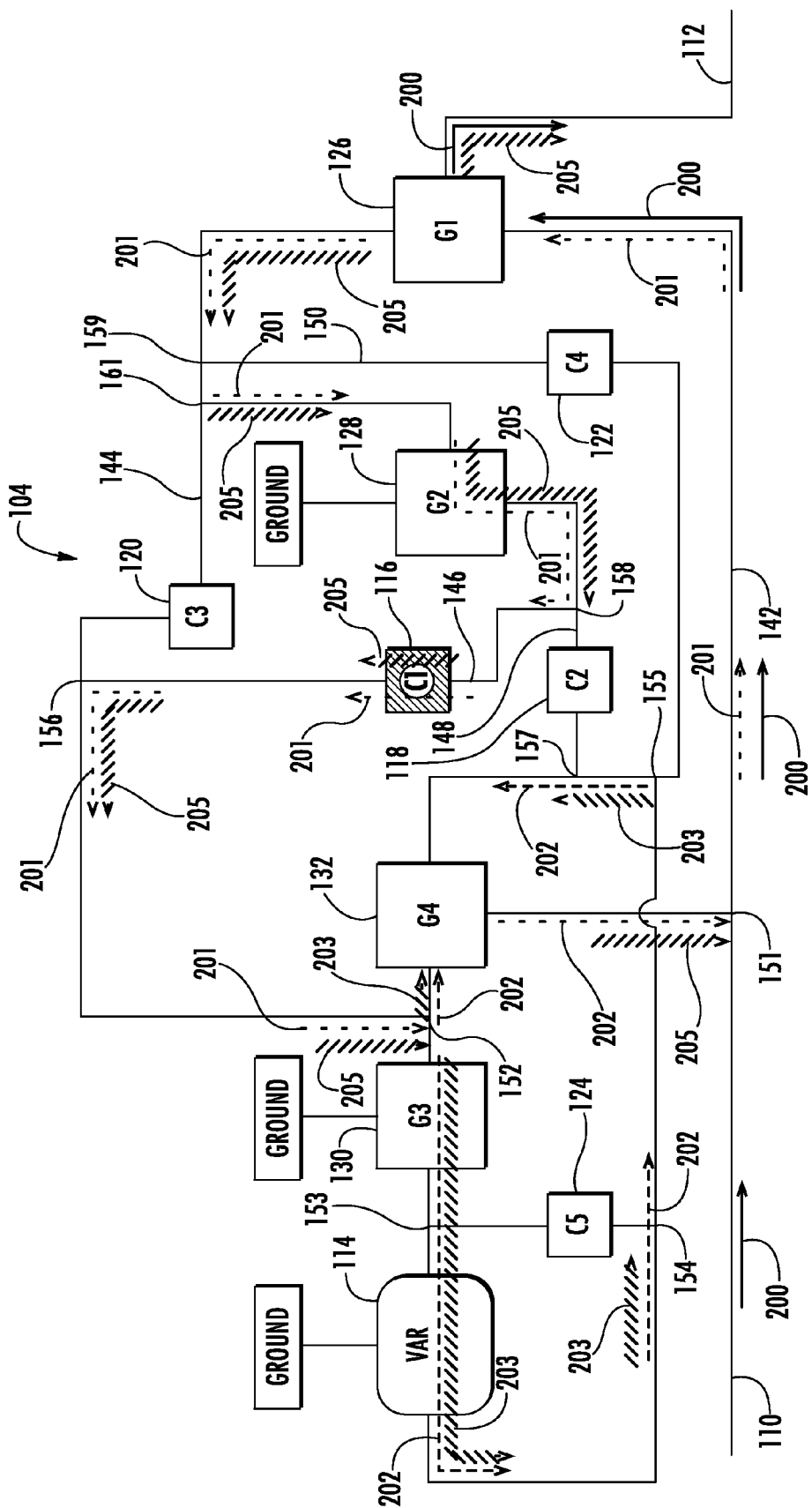
FIG. 6 is a block diagrammatic view of the infinitely variable transmission of FIG. 3 showing power flow therethrough in a first reverse operating mode.
Figure 7:
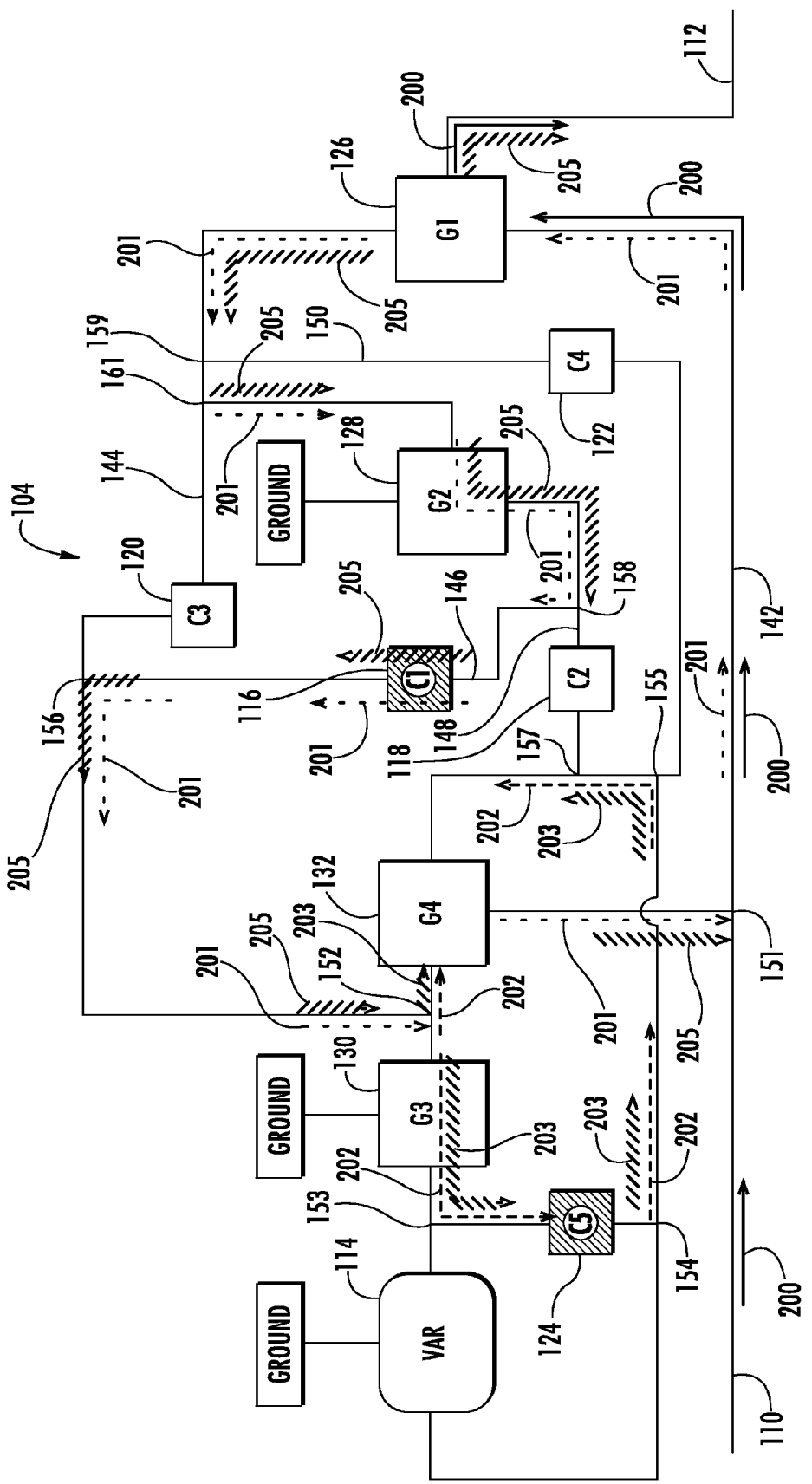
FIG. 7 is a block diagrammatic view of the infinitely variable transmission of FIG. 3 showing power flow therethrough in a first variator bypass operating mode.
Figure 8:
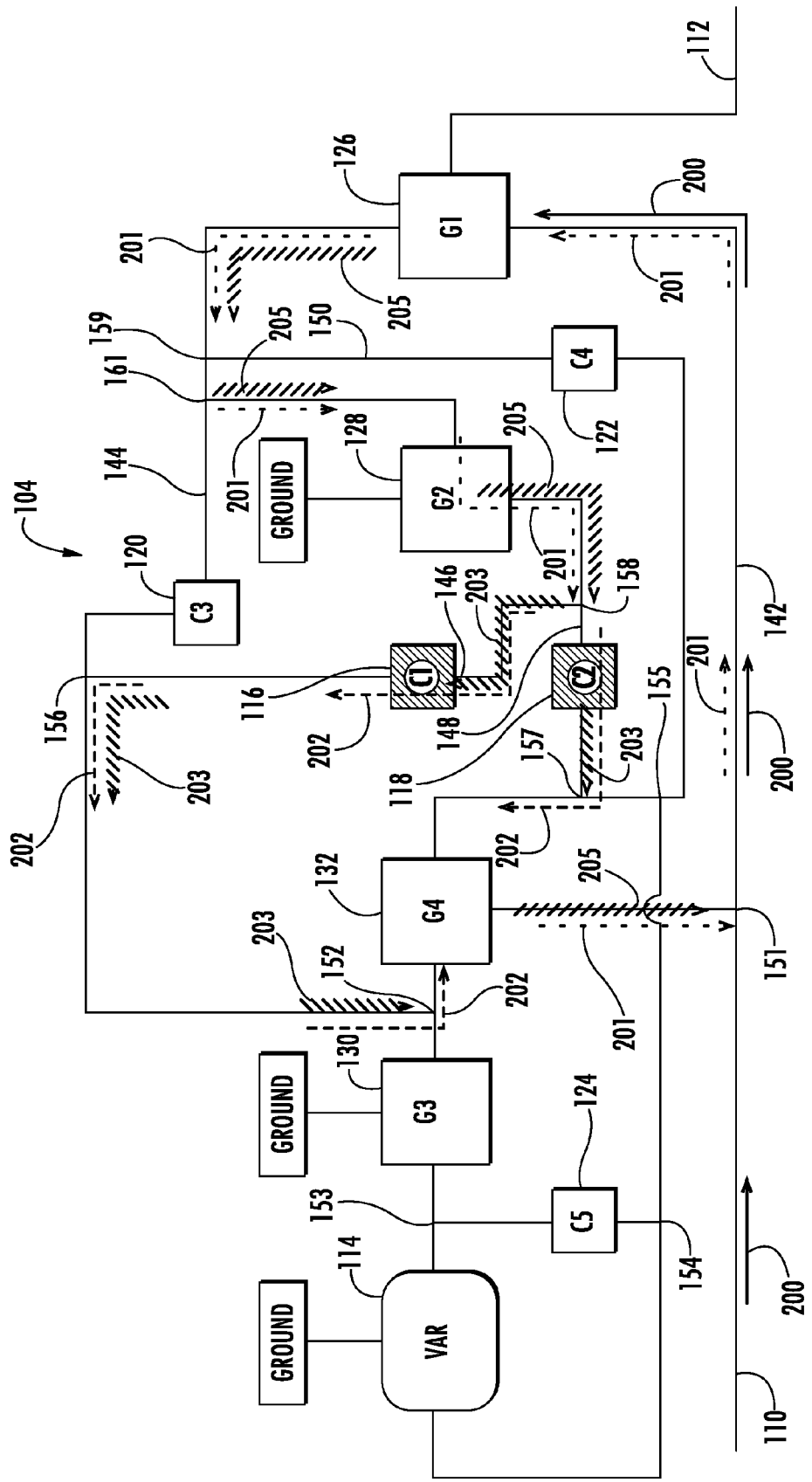
FIG. 8 is a block diagrammatic view of the infinitely variable transmission of FIG. 3 showing power flow therethrough in a first synchronous operating mode.

The "fixed" sub-path of the power path 142 corresponds to power flowing through the junction 151 and the first gearset 126. The "variable" sub-path of the power path 142 corresponds to power flowing from the first gearset 126 to the junction 159 and therefrom toward the variator 114 along one of the power paths 144, 146, 148, 150 (e.g., as shown in FIGS. 6-8).

Figure 11:
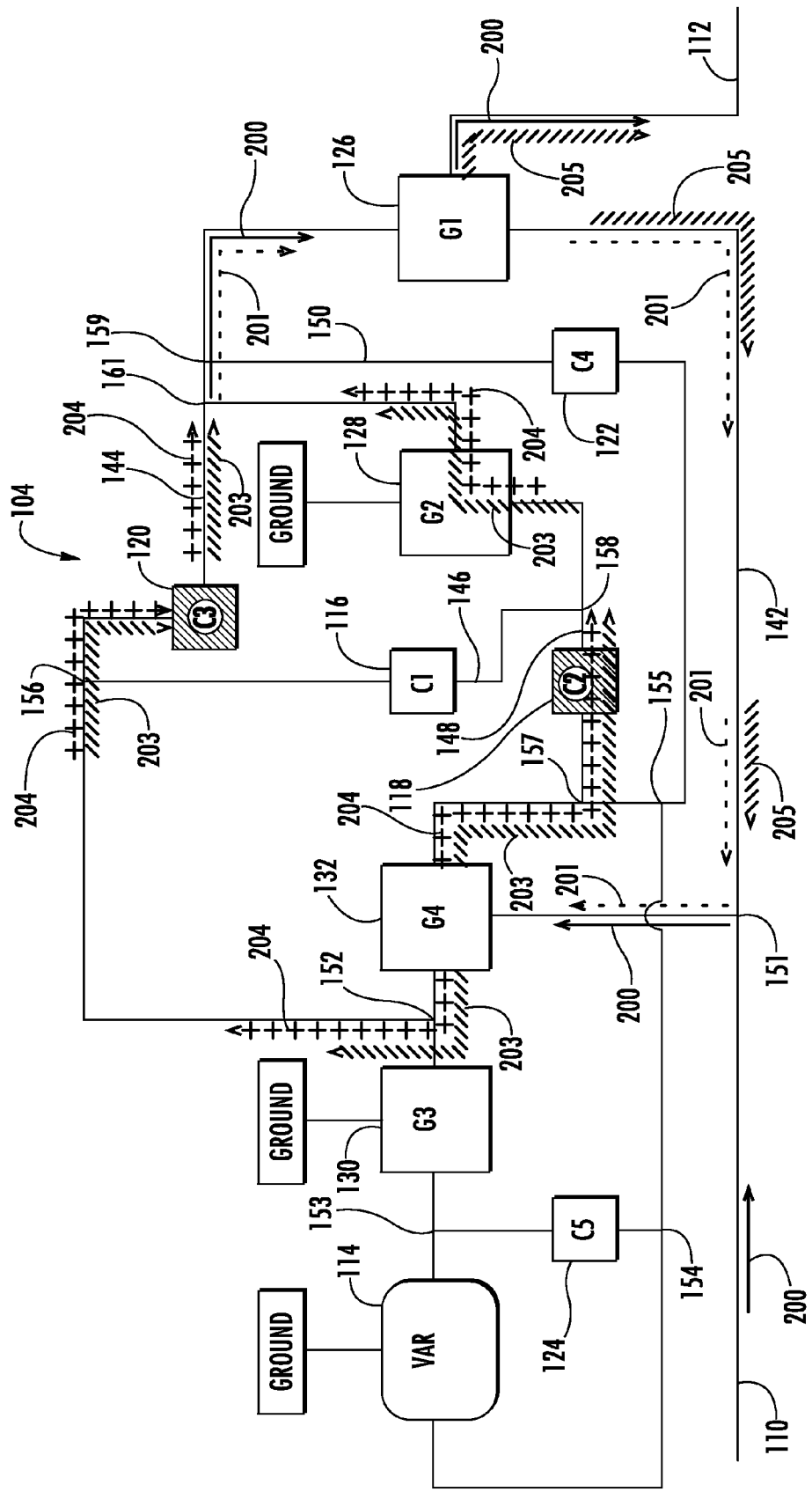
FIG. 11 is a block diagrammatic view of the infinitely variable transmission of FIG. 3 showing power flow therethrough in a second synchronous operating mode.
Figure 12:
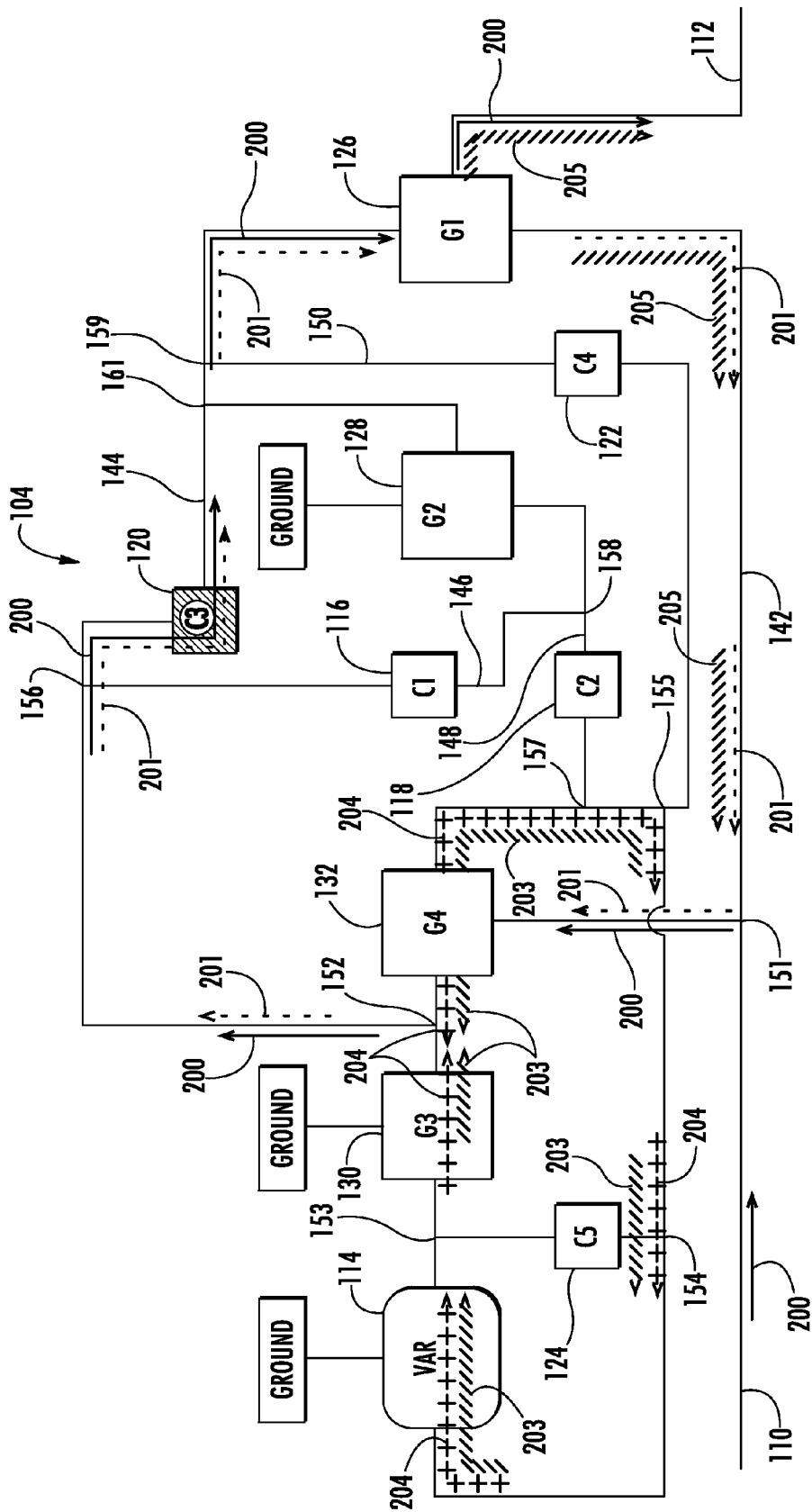
FIG. 12 is a block diagrammatic view of the infinitely variable transmission of FIG. 3 showing power flow therethrough in a third forward operating mode.
Figure 14:
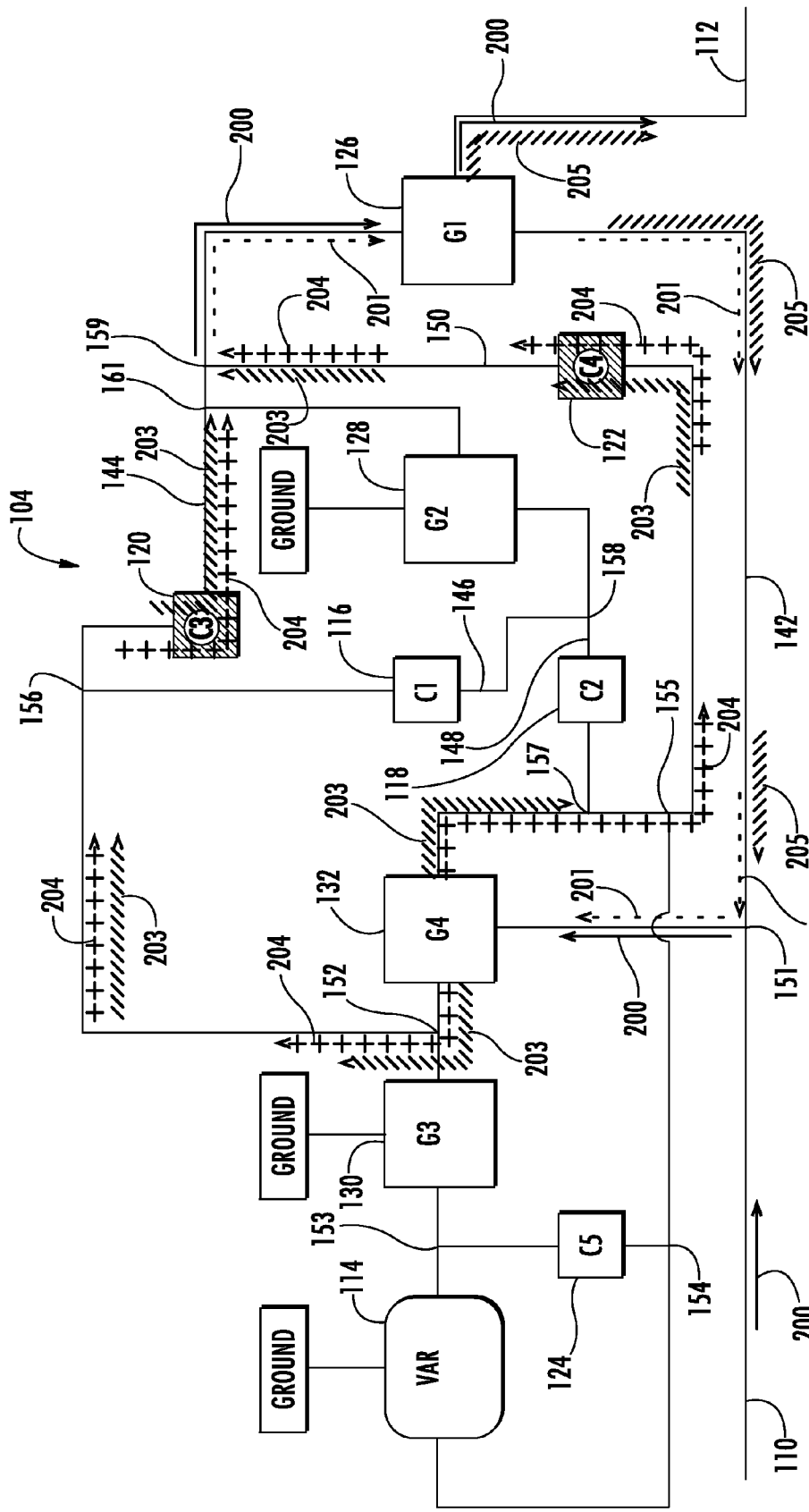
FIG. 14 is a block diagrammatic view of the infinitely variable transmission of FIG. 3 showing power flow therethrough in a third synchronous operating mode.

The power path 144 is defined by the fourth gearset 132, a junction 152, a junction 156, the third clutch 120, a junction 161, the second gearset 128, a junction 159, the third gearset 130, a junction 153, the variator 114, the variator bypass clutch 124, a junction 154, and a junction 155. Similar to the power path 142, the power path 144 utilizes a "fixed" and a "variable" sub-path to transmit power between components of the transmission 104. The "fixed" sub-path of the power path 144 corresponds to power flowing through the junctions 152, 156 and the second gearset 128 when the third clutch 120 is engaged (e.g., as shown in FIGS. 11 and 14). The "variable" sub-path of the power path 144 corresponds to power flowing between the junctions 152, 155 (i.e., through the third gearset 130 and the variator 114) when the third clutch 120 is engaged and the variator bypass clutch 124 is not engaged (e.g., as shown in FIG. 12).

The power path 146 is defined by the fourth gearset 132, the junction 152, the junction 156, the first clutch 116, the junction 158, the second gearset 128, the junction 159, the junction 161, the third gearset 130, the junction 153, the variator 114, the variator bypass clutch 124, the junction 154, and the junction 155. Similar to the power path 144, the power path 146 utilizes a "fixed" sub-path and a "variable" sub-path to transmit power between components of the transmission 104. The "fixed" sub-path of the power path 146 corresponds to power flowing through the junctions 152, 156, 158 and the second gearset 128 when the first clutch 116 is engaged (e.g., as shown in FIG. 8). The "variable" sub-path of the power path 146 corresponds to power flowing between the junctions 152, 155 when the first clutch 116 is engaged and the variator bypass clutch 124 is not engaged (e.g., as shown in FIG. 6).

Figure 9:
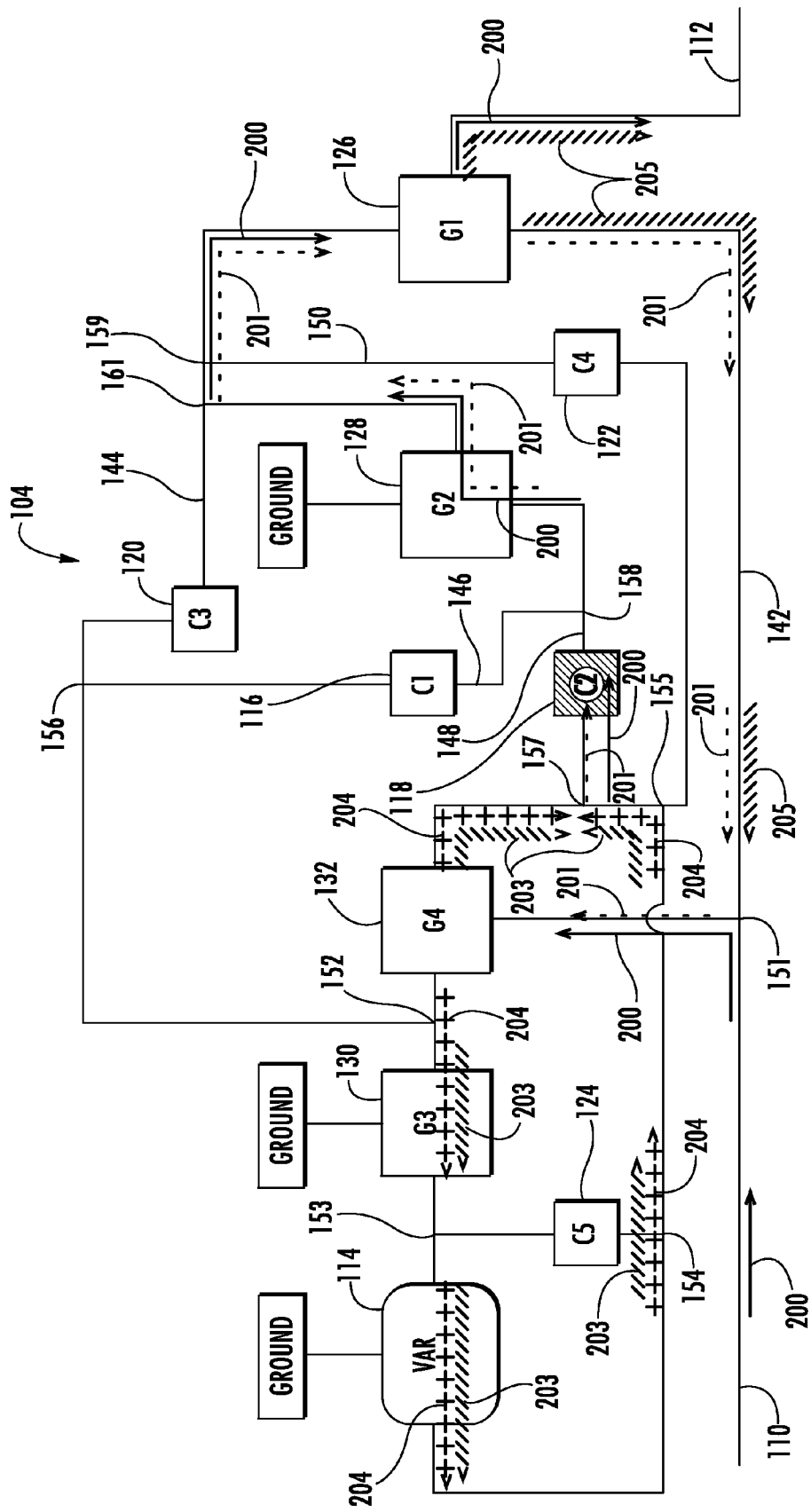
FIG. 9 is a block diagrammatic view of the infinitely variable transmission of FIG. 3 showing power flow therethrough in a second forward operating mode.

The power path 148 is defined by the fourth gearset 132, the junction 155, the junction 157, the second clutch 118, the junction 158, the second gearset 128, the junction 159, the junction 161, the third gearset 130, the junction 153, the variator 114, the variator bypass clutch 124, the junction 154, and the junction 152. Similar to the power path 146, the power path 148 utilizes a "fixed" and a "variable" sub-path to transmit power between components of the transmission 104. The "fixed" sub-path of the power path 148 corresponds to power flowing through the junctions 155, 157, 158 and the second gearset 128 when the second clutch 118 is engaged (e.g., as shown in FIG. 8). The "variable" sub-path of the power path 148 corresponds to power flowing between the junctions 152, 155 when the second clutch 118 is engaged and the variator bypass clutch 124 is not engaged (e.g., as shown in FIG. 9).

Figure 15:
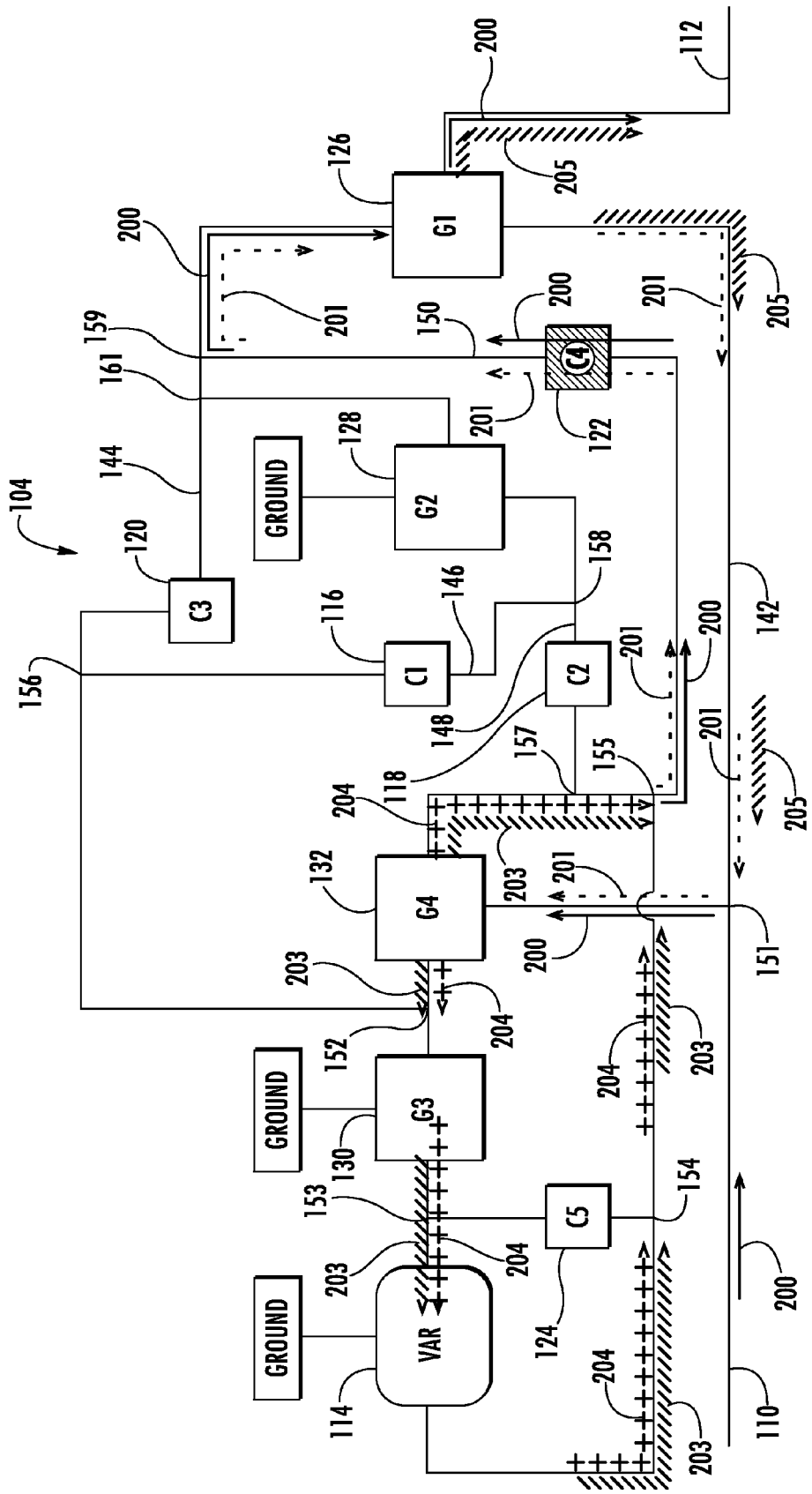
FIG. 15 is a block diagrammatic view of the infinitely variable transmission of FIG. 3 showing power flow therethrough in a fourth forward operating mode.

The power path 150 is defined by the fourth gearset 132, the junction 155, the junction 157, the fourth clutch 122, the second gearset 128, the junction 159, the junction 161, the junction 152, the third gearset 130, the junction 153, the variator 114, the variator bypass clutch 124, and the junction 154. Similar to the power path 148, the power path 150 utilizes a "fixed" and a "variable" sub-path to transmit power between components of the transmission 104. The "fixed" sub-path of the power path 150 corresponds to power flowing through the junctions 155, 157 and the second gearset 128 when the fourth clutch 122 is engaged (e.g., as shown in FIG. 14). The "variable" sub-path of the power path 150 corresponds to power flowing between the junctions 152, 155 when the fourth clutch 122 is engaged and the variator bypass clutch 124 is not engaged (e.g., as shown in FIG. 15).

The fourth gearset 132, similar to the first gearset 126, is a "mixing" planetary gearset that allows power transmitted thereto to be transmitted along at least one of the power paths 144, 146, 148, 150 or recirculated back toward the junction 151 and the input shaft 110 as shown in FIGS. 6-16. Each component of the fourth gearset 132 (i.e., a sun gear, a carrier, a ring gear, and a plurality of planet gears of the fourth gearset 132 as described in more detail below) rotates and is configured to transmit power (i.e., no component of the fourth gearset 132 is grounded).

Figure 4:
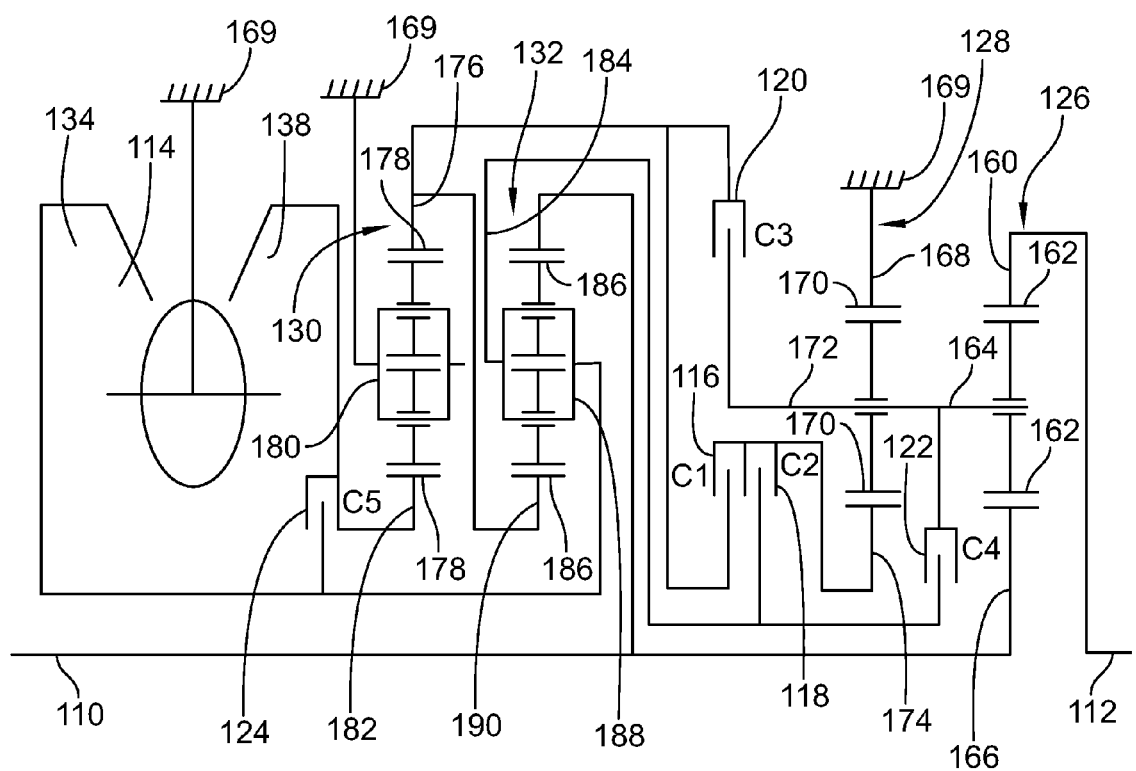
FIG. 4 is a schematic of the architecture of FIG. 3 and the associated transmission components showing the interconnections between the components.

Referring now to FIG. 4, the variator 114, the plurality of gearsets 125, and the plurality of clutches 115 of the transmission 104 are physically arranged between the input shaft 110 and the output shaft 112 of the transmission 104. In the illustrative embodiment, the variator 114 is positioned in front of the plurality of clutches 115 and the plurality of gearsets 125 relative to the input shaft 110 as shown in FIG. 4.

The first gearset 126 of the plurality of gearsets 125 is configured to receive power supplied by the input shaft 110 and transmitted to the junction 151 and thereafter to the first gearset 126 as shown, for example, in FIGS. 6-8. In addition, the first gearset 126 is configured to receive power supplied by the input shaft 110 and transmitted to the fourth gearset 132 and thereafter to the first gearset 126 as shown, for example, in FIGS. 9-16. The first gearset 126 is illustratively a simple planetary gearset that includes a ring gear 160, a plurality of planet gears 162, a carrier 164, and a sun gear 166 as shown in FIG. 4. Each of the planet gears 162 is intermeshed with the ring gear 160 and the sun gear 166, and each of the planet gears 162 is supported for rotation by the carrier 164. The ring gear 160 is coupled to the output shaft 112. The carrier 164 is coupled to the second gearset 128, and the fourth clutch 122 is engageable to couple the carrier 164 to the fourth gearset 132.

Figure 10:
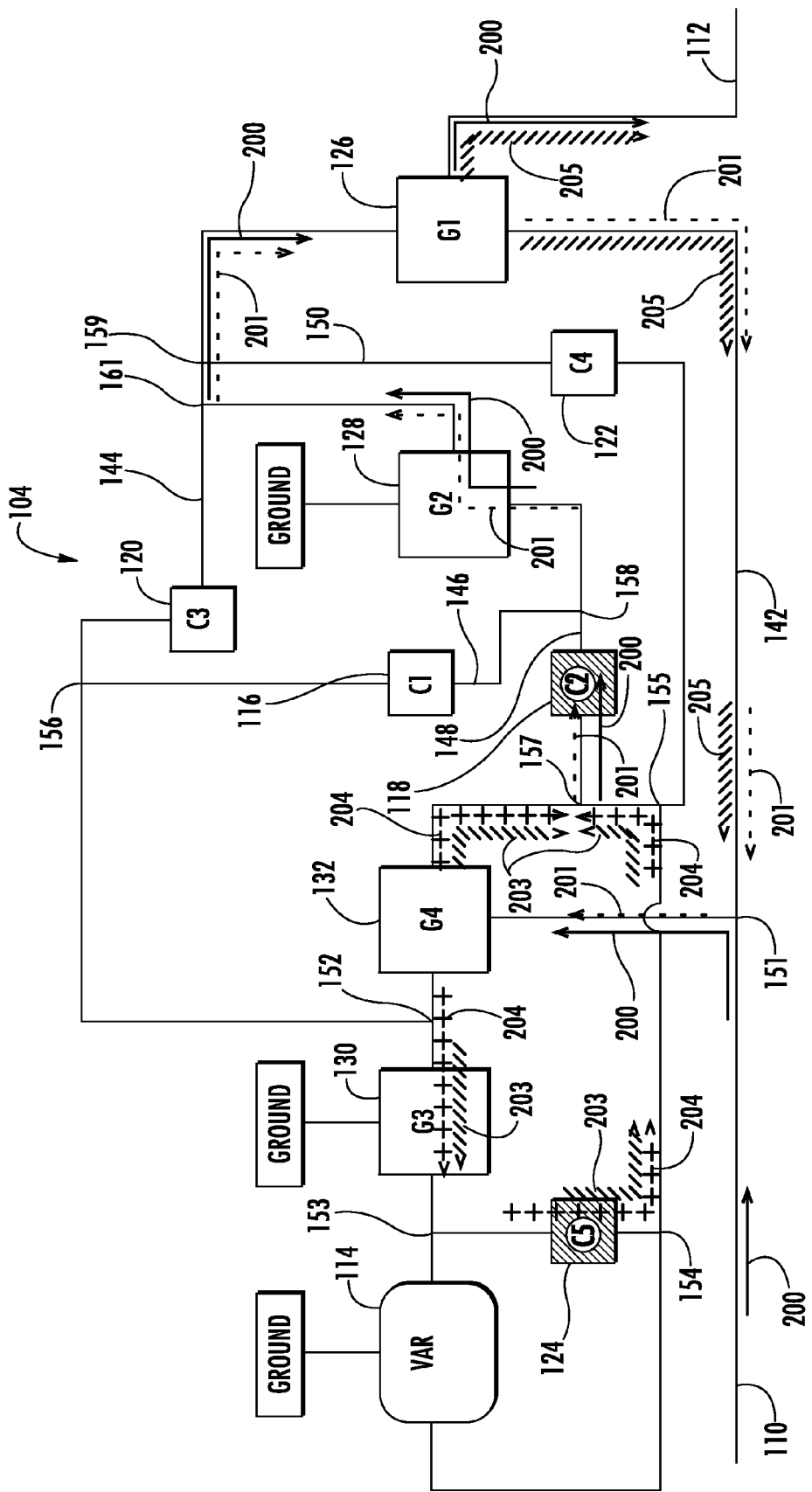
FIG. 10 is a block diagrammatic view of the infinitely variable transmission of FIG. 3 showing power flow therethrough in a second variator bypass operating mode.

The second gearset 128 of the plurality of gearsets 125 is configured to receive power supplied by the input shaft 110 and transmitted thereto from the first gearset 126 as shown in FIGS. 6-8 or from the fourth gearset 132 as shown in FIGS. 9-11. The second gearset 128, similar to the first gearset 126, is illustratively a simple planetary gearset that includes a ring gear 168, a plurality of planet gears 170, a carrier 172, and a sun gear 174. Each of the planet gears 170 is intermeshed with the ring gear 168 and the sun gear 174, and each of the planet gears 170 is supported for rotation by the carrier 172. The ring gear 168 is coupled to a stationary, non-rotating part of the transmission 104, thereby preventing the ring gear 168 from rotating (i.e., braking the ring gear 168). For instance, the ring gear 168 may be coupled to a housing 169 of the transmission 104. The carrier 172 is coupled to the carrier 164 of the first gearset 126, and the third clutch 120 is engageable to couple the carrier 172 to the third gearset 130. In this manner, the third clutch 120 is engageable to couple the carrier 164 of the first gearset 126 to the third gearset 130 through the carrier 172 of the second gearset 128. The second clutch 118 is engageable to couple the sun gear 174 to the fourth gearset 132. The first clutch 116 is engageable to couple the sun gear 174 to the third gearset 130.

The third gearset 130 of the plurality of gearsets 125 is configured to receive power supplied by the input shaft 110 and transmitted between the junctions 152, 155 as shown in FIGS. 6-16. The third gearset 130 is illustratively an idler-planet planetary gearset that includes a ring gear 176, a plurality of planet gears 178 including one or more idler-planet gears, a carrier 180, and a sun gear 182. Each of the planet gears 178 is intermeshed with either the ring gear 176 or the sun gear 182 and another one of the planet gears 178, and each of the planet gears 178 is supported for rotation by the carrier 180. The carrier 180 is coupled to a stationary, non-rotating part of the transmission 104, thereby preventing the carrier 180 from rotating (i.e., braking the carrier 180). For instance, the carrier 180 may be coupled to the housing 169 of the transmission 104. The sun gear 178 is coupled to the output ring 138 of the variator 114, and the variator bypass clutch 124 is engageable to lock the input ring 134 to the output ring 138 so that the sun gear 178 is coupled to the input ring 134 and the variator 114 is bypassed. The ring gear 176 is coupled to the fourth gearset 132. The third clutch 120 is engageable to couple the ring gear 176 to the carrier 172 of the second gearset 128, and the first clutch 116 is engageable to couple the ring gear 176 to the sun gear 174 of the second gearset 128.

The fourth gearset 132 of the plurality of gearsets 125 is configured to receive power supplied by the input shaft 110 and transmitted thereto from the junction 151, and also power that is transmitted to the fourth gearset 132 from the first gearset 126 as shown in FIGS. 6-16. The fourth gearset 132 is illustratively an idler-planet planetary gearset that includes a ring gear 184, a plurality of planet gears 186 including one or more idler-planet gears, a carrier 188, and a sun gear 190. Each of the planet gears 186 is intermeshed with either the ring gear 184 or the sun gear 190 and another one of the planet gears 186, and each of the planet gears 186 is supported for rotation by the carrier 188. The sun gear 190 is coupled to the ring gear 176 of the third gearset 130. The ring gear 184 is coupled to the input shaft 110. The carrier 188 is coupled to the input ring 134 of the variator 114, and the variator bypass clutch 124 is engageable to couple the carrier 188 to the output ring 138 of the variator 114. The second clutch 118 is engageable to couple the carrier 188 to the sun gear 174 of the second gearset 128, and the fourth clutch 122 is engageable to couple the carrier 188 to the carriers 164, 172 of the first and second gearsets 126, 128, respectively.

A power take-off device (not shown) may be coupled to the variator 114 to transmit power from the drive unit 102 to the variator 114 and therefrom to the power-take off device. The power take-off device may be coupled to the input ring 134 or the output ring 138 of the variator 114. When the transmission 104 is placed in a neutral range, the variator 114 may be used to continuously vary the ratio of the power-take off device relative to the rotational speed of the drive unit output shaft 108 and the transmission input shaft 110.

Referring now to FIG. 5, a table 192 illustrates the various operating modes of the transmission 104, the clutches applied in each mode, the transmission ratio(s) achieved in each mode, and the figure(s) in which each mode is shown. The transmission 104 is operable in four operating modes to achieve a variable transmission ratio within a defined transmission ratio range. In all other operating modes, as discussed below, the transmission 104 achieves a single transmission ratio.

The transmission 104 is operable in the "Mode 1" operating mode, when the first clutch 116 is engaged as shown in FIG. 5, to achieve a variable transmission ratio within the range of −0.232 (minimum) to 0.000 (maximum). As suggested above, the variable transmission ratio is achievable in "Mode 1" as a result of utilizing the variator 114. The "Mode 1" operating mode covers a reverse ratio range (i.e., a ratio from −0.232 to 0) to a zero ratio (i.e., "Mode 1" serves as a first geared neutral mode).

The transmission 104 is operable in the "Bypass 1" operating mode, when the first clutch 116 and and the variator bypass clutch 124 are contemporaneously engaged as shown in FIG. 5, to achieve a fixed transmission ratio of −0.125. Because the variator 114 is bypassed in the "Bypass 1" mode, only a single fixed transmission ratio is achieved by the transmission 104. The "Bypass 1" operating mode covers a reverse ratio as shown in FIG. 5.

The transmission 104 is operable in the "Sync 1-2" operating mode, when the first clutch 116 and the second clutch 118 are contemporaneously engaged as shown in FIG. 5, to achieve a fixed transmission ratio of 0.000. The ratio of 0.000 coincides with the maximum ratio achieved in the "Mode 1" operating mode and the minimum ratio achieved in the "Mode 2" operating mode (discussed below) so that the "Sync 1-2" operating mode effects a transition (i.e., a synchronous shift) between those two modes. A single fixed transmission ratio is achieved by the transmission 104 in the "Sync 1-2" mode because the variator 114 is effectively bypassed. The "Sync 1-2" operating mode covers another zero ratio (i.e., "Sync 1-2" serves as a second geared neutral mode).

The transmission 104 is operable in the "Mode 2" operating mode, when the second clutch 118 is engaged as shown in FIG. 5, to achieve a variable transmission ratio within the range of 0.000 (minimum) to 0.247 (maximum). As suggested above, the variable transmission ratio is achievable in "Mode 2" as a result of utilizing the variator 114. The "Mode 2" operating mode covers another zero ratio (i.e., "Mode 2" serves as a third geared neutral mode) to a forward ratio range (i.e., from 0.000 to 0.247).

The transmission 104 is operable in the "Bypass 2" operating mode, when the second clutch 118 and the variator bypass clutch 124 are contemporaneously engaged as shown in FIG. 5, to achieve a fixed transmission ratio of 0.132. Because the variator 114 is bypassed in the "Bypass 2"

mode, only a single fixed transmission ratio is achieved by the transmission 104. The "Bypass 2" operating mode covers a forward ratio as shown in FIG. 5.

The transmission 104 is operable in the "Sync 2-3" operating mode, when the second clutch 118 and the third clutch 120 are contemporaneously engaged as shown in FIG. 5, to achieve a fixed transmission ratio of 0.247. The ratio of 0.247 coincides with the maximum ratio achieved in the "Mode 2" operating mode and the minimum ratio achieved in the "Mode 3" operating mode (discussed below) so that the "Sync 2-3" operating mode effects a transition (i.e., a synchronous shift) between those two modes. A single fixed transmission ratio is achieved by the transmission 104 in the "Sync 2-3" mode because the variator 114 is effectively bypassed. The "Sync 2-3" operating mode covers another forward ratio as shown in FIG. 5.

The transmission 104 is operable in the "Mode 3" operating mode, when the third clutch 120 is engaged as shown in FIG. 5, to achieve a variable transmission ratio within the range of 0.247 (minimum) to 1.000 (maximum). As suggested above, the variable transmission ratio is achievable in "Mode 3" as a result of utilizing the variator 114. The "Mode 3" operating mode covers another forward ratio range as shown in FIG. 5.

The transmission 104 is operable in the "Bypass 3" operating mode, when the third clutch 120 and the variator bypass clutch 124 are contemporaneously engaged as shown in FIG. 5, to achieve a fixed transmission ratio of 0.596. Because the variator 114 is bypassed in the "Bypass 3" mode, only a single fixed transmission ratio is achieved by the transmission 104. The "Bypass 3" operating mode covers another forward ratio as shown in FIG. 5.

The transmission 104 is operable in the "Sync 3-4" operating mode, when the third clutch 120 and the fourth clutch 122 are contemporaneously engaged as shown in FIG. 5, to achieve a fixed transmission ratio of 1.000. The ratio of 1.000 coincides with the maximum ratio achieved in the "Mode 3" operating mode and the minimum ratio achieved in the "Mode 4" operating mode (discussed below) so that the "Sync 3-4" operating mode effects a transition (i.e., a synchronous shift) between those two modes. A single fixed transmission ratio is achieved by the transmission 104 in the "Sync 3-4" mode because the variator 114 is effectively bypassed. The "Sync 3-4" operating mode covers another forward ratio as shown in FIG. 5.

The transmission 104 is operable in the "Mode 4" operating mode, when the fourth clutch 122 is engaged as shown in FIG. 5, to achieve a variable transmission ratio within the range of 1.000 (minimum) to 1.800 (maximum). As suggested above, the variable transmission ratio is achievable in "Mode 4" as a result of utilizing the variator 114. The "Mode 4" operating mode covers another forward ratio range as shown in FIG. 5.

The transmission 104 is operable in the "Bypass 4" operating mode, when the fourth clutch 122 and the variator bypass clutch 124 are contemporaneously engaged as shown in FIG. 5, to achieve a fixed transmission ratio of 1.430. Because the variator 114 is bypassed in the "Bypass 4" mode, only a single fixed transmission ratio is achieved by the transmission 104. The "Bypass 4" operating mode covers another forward ratio as shown in FIG. 5.

Referring now to FIGS. 6-16, power flow from the input shaft 110 to the output shaft 112 of the transmission 104 is illustrated in each of the operating modes discussed above. Beginning with "Mode 1" of table 192, power flows from the input shaft 110 to the output shaft 112 of the transmission 104 as shown in FIG. 6. Input power 200 (designated by the solid arrows) flows from the input shaft 110 to the junction 151 and thereafter to the first gearset 126. Input power 200 reaching the first gearset 126 is modified by the "mixing" gearset 126 such that some of the power that is output by the first gearset 126 flows to the output shaft 112 and some of the power flows back to the junction 151, as described in greater detail below.

Recirculated power 201 (designated by the dotted arrows) is recirculated from the first gearset 126 back to the junction 151 as shown in FIG. 6. Specifically, recirculated power 201 flows from the first gearset 126 to the junction 152 through the junctions 159, 161, 158, 156, the second gearset 128, and the first clutch 116. Recirculated power 201 reaching the junction 152 is split so that recirculated power 201 becomes split recirculated power 202, and split recirculated power 202 flows from the junction 152 to the fourth gearset 132 such that recirculated power 201 is reconstituted at the fourth gearset 132 as discussed below. After recirculated power 201 has been reconstituted at the fourth gearset 132, recirculated power 201 flows to the junction 151. At the junction 151, recirculated power 201 is combined with input power 200 received from the input shaft 110. Recirculated power 201 then flows in parallel with input power 200 from the junction 151 to the first gearset 126 in identical fashion to input power 200. Hereafter, the combination of input power 200 and recirculated power 201 is referred to as "combined power" and is understood to be greater than input power 200 and recirculated power 201.

Split recirculated power 202 (designated by the "x" arrows) flows from the junction 152 directly to the fourth gearset 132, and also from the junction 152 to the fourth gearset 132 through the third gearset 130, the junctions 153, 154, 155, 157, and the variator 114 as shown in FIG. 6. As a result, the variator 114 is subjected to only a portion of the recirculated power 201 (i.e., split recirculated power 202) transmitted to the junction 152. As indicated above, the split recirculated power 202 flowing directly from the junction 152 to the fourth gearset 132 is combined with the split recirculated power 202 flowing from the junction 152 to the fourth gearset 132 through the variator 114 such that recirculated power 201 is reconstituted at the fourth gearset 132.

The "mixing" gearset 126 breaks up the combined power into split power 205 (designated by the backslashed arrows), which is transmitted to the output shaft 112 and back to the junction 151, as shown in FIG. 6. In this way, some split power 205 flows from the first gearset 126 to the output shaft 112 (like input power 200), thereby adding to the power transmitted to the output shaft 112. Some split power 205 also flows from the first gearset 126 to the junction 151 through the gearsets 128, 132, the first clutch 116, and the junctions 159, 161, 158, 156 and, like recirculated power 201, back through the first gearset 126 in parallel with input power 200.

The junction 152 divides the split power 205 transmitted thereto from the first gearset 126 into split power 203 (designated by the slashed arrows) as shown in FIG. 6. Split power 203 is transmitted from the junction 152 to the fourth gearset 132 in parallel with split recirculated power 202 in identical fashion to split recirculated power 202. As such, split power 205 is reconstituted at the fourth gearset 132, and split power 205 reconstituted at the fourth gearset 132 flows thereafter to the junction 156 as shown in FIG. 6.

Turning now to the "Bypass 1" mode of table 192, power flows from the input shaft 110 to the output shaft 112 of the transmission 104 as shown in FIG. 7. Input power 200 (designated by the solid arrows) flows from the input shaft 110 to the junction 151 and thereafter to the first gearset 126.

Input power 200 reaching the first gearset 126 is modified by the "mixing" gearset 126 such that some of the power that is output by the first gearset 126 flows to the output shaft 112 and some of the power flows back to the junction 151, as described in greater detail below.

Recirculated power 201 (designated by the dotted arrows) is recirculated from the first gearset 126 back to the junction 151 as shown in FIG. 7. Specifically, recirculated power 201 flows from the first gearset 126 to the junction 152 through the junctions 159, 161, 158, 156, the second gearset 128, and the first clutch 116. Recirculated power 201 reaching the junction 152 is split so that recirculated power 201 becomes split recirculated power 202, and split recirculated power 202 flows from the junction 152 to the fourth gearset 132 such that recirculated power 201 is reconstituted at the fourth gearset 132 as discussed below. After recirculated power 201 has been reconstituted at the fourth gearset 132, recirculated power 201 flows to the junction 151. At the junction 151, recirculated power 201 is combined with input power 200 received from the input shaft 110. Recirculated power 201 then flows in parallel with input power 200 from the junction 151 to the first gearset 126 in identical fashion to input power 200. Hereafter, the combination of input power 200 and recirculated power 201 is referred to as "combined power" and is understood to be greater than input power 200 and recirculated power 201.

Split recirculated power 202 (designated by the "x" arrows) flows from the junction 152 directly to the fourth gearset 132, and also from the junction 152 to the fourth gearset 132 through the third gearset 130, the junctions 153, 154, 155, 157, and the variator bypass clutch 126 as shown in FIG. 6. As indicated above, the split recirculated power 202 flowing directly from the junction 152 to the fourth gearset 132 is combined with the split recirculated power 202 flowing from the junction 152 to the fourth gearset 132 through the variator bypass clutch 126 such that recirculated power 201 is reconstituted at the fourth gearset 132.

The "mixing" gearset 126 breaks up the combined power into split power 205 (designated by the backslashed arrows), which is transmitted to the output shaft 112 and back to the junction 151, as shown in FIG. 7. In this way, some split power 205 flows from the first gearset 126 to the output shaft 112 (like input power 200), thereby adding to the power transmitted to the output shaft 112. Some split power 205 also flows from the first gearset 126 to the junction 151 through the gearsets 128, 132, the first clutch 116, and the junctions 159, 161, 158, 156 and, like recirculated power 201, back through the first gearset 126 in parallel with input power 200.

The junction 152 divides the split power 205 transmitted thereto from the first gearset 126 into split power 203 (designated by the slashed arrows) as shown in FIG. 7. Split power 203 is transmitted from the junction 152 to the fourth gearset 132 in parallel with split recirculated power 202 in identical fashion to split recirculated power 202. As such, split power 205 is reconstituted at the fourth gearset 132, and split power 205 reconstituted at the fourth gearset 132 flows thereafter to the junction 156 as shown in FIG. 7.

Turning now to the "Sync 1-2" mode of table 192, power flows from the input shaft 110 to the output shaft 112 of the transmission 104 as shown in FIG. 8. Input power 200 (designated by the solid arrows) flows from the input shaft 110 to the junction 151 and thereafter to the first gearset 126. Input power 200 reaching the first gearset 126 flows entirely back to the junction 151 from the first gearset 126, as described in greater detail below.

Recirculated power 201 (designated by the dotted arrows) is recirculated from the first gearset 126 back to the junction 151 as shown in FIG. 8. Specifically, recirculated power 201 flows from the first gearset 126 to the junction 158 through the junctions 159, 161 and the second gearset 128. Recirculated power 201 reaching the junction 158 is split so that recirculated power 201 becomes split recirculated power 202, and split recirculated power 202 flows from the junction 158 to the fourth gearset 132 such that recirculated power 201 is reconstituted at the fourth gearset 132 as discussed below. After recirculated power 201 has been reconstituted at the fourth gearset 132, recirculated power 201 flows to the junction 151. At the junction 151, recirculated power 201 is combined with input power 200 received from the input shaft 110. Recirculated power 201 then flows in parallel with input power 200 from the junction 151 to the first gearset 126 in identical fashion to input power 200. Hereafter, the combination of input power 200 and recirculated power 201 is referred to as "combined power" and is understood to be greater than input power 200 and recirculated power 201.

Split recirculated power 202 (designated by the "x" arrows) flows from the junction 158 to the fourth gearset 132 through the first clutch 116 and the junctions 156, 152, and also from the junction 158 to the fourth gearset 132 through the second clutch 118 and the junction 157 as shown in FIG. 8. As indicated above, the split recirculated power 202 flowing from the junction 158 to the fourth gearset 132 through the first clutch 116 is combined with the split recirculated power 202 flowing from the junction 158 to the fourth gearset 132 through the second clutch 118 such that recirculated power 201 is reconstituted at the fourth gearset 132.

Combined power flowing from the junction 151 to the first gearset 126 is designated split power 205 (see the backslashed arrows), which is transmitted entirely back to the junction 151 from the first gearset 126 as shown in FIG. 8. Split power 205 flows from the first gearset 126 to the junction 151 through the gearsets 128, 132 and the junctions 159, 161, 158 and, like recirculated power 201, back through the first gearset 126 in parallel with input power 200.

The junction 158 divides the split power 205 transmitted thereto from the first gearset 126 into split power 203 (designated by the slashed arrows) as shown in FIG. 8. Split power 203 is transmitted from the junction 158 to the fourth gearset 132 in parallel with split recirculated power 202 in identical fashion to split recirculated power 202. As such, split power 205 is reconstituted at the fourth gearset 132, and split power 205 reconstituted at the fourth gearset 132 flows thereafter to the junction 156 as shown in FIG. 8.

Turning now to "Mode 2" of table 192, power flows from the input shaft 110 to the output shaft 112 of the transmission 104 as shown in FIG. 9. Input power 200 (designated by the solid arrows) flows from the input shaft 110 to the junction 151 and thereafter to the fourth gearset 132 as shown in FIG. 9. Input power 200 transmitted to the fourth gearset 132 is modified by the "mixing" gearset 132 such that a first portion of the input power 200 is transmitted directly to the junction 157 and a second portion of the input power 200 is transmitted to the junction 157 through the variator 114. As such, input power 200 is reconstituted at the junction 157, and input power 200 is transmitted thereafter from the junction 157 to the first gearset 126 through the second clutch 118, the second gearset 128, and the junctions 158, 159, 161. Some of the input power 200 that is output from the first gearset 126 flows to the output shaft 112, and some of the input power 200 flows back to the junction 151, as described in greater detail below.

The first and second portions of input power 200 flowing from the fourth gearset 134 to the junction 157 are designated input power 204 (see the plus-sign arrows) as shown in FIG. 9. Input power 204 flows from the fourth gearset 132 directly to the junction 157, and input power 204 also flows from the fourth gearset 132 to the junction 157 through the junctions 152, 153, 154, 155, the third gearset 130, and the variator 114. Input power 200 is thereby reconstituted at the junction 157 as indicated above.

Recirculated power 201 (designated by the dotted arrows) is recirculated from the first gearset 126 back to the junction 151 as shown in FIG. 9. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows directly to the junction 157 in parallel with input power 204 and also to the junction 157 through the junctions 152, 153, 154, the third gearset 130, and the variator 114 in parallel with input power 204. Like input power 200, recirculated power 201 is reconstituted at the junction 157, and recirculated power 201 flows thereafter from the junction 157 to the first gearset 126 through the second clutch 118, the second gearset 128, and the junctions 158, 161, 159 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 9. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Turning now to the "Bypass 2" mode of table 192, power flows from the input shaft 110 to the output shaft 112 of the transmission 104 as shown in FIG. 10. Input power 200 (designated by the solid arrows) flows from the input shaft 110 to the junction 151 and thereafter to the fourth gearset 132 as shown in FIG. 10. Input power 200 transmitted to the fourth gearset 132 is modified by the "mixing" gearset 132 such that a first portion of the input power 200 is transmitted directly to the junction 157 and a second portion of the input power 200 is transmitted to the junction 157 through the variator bypass clutch 124. As such, input power 200 is reconstituted at the junction 157, and input power 200 is transmitted thereafter from the junction 157 to the first gearset 126 through the second clutch 118, the second gearset 128, and the junctions 158, 159, 161. Some of the input power 200 that is output from the first gearset 126 flows to the output shaft 112, and some of the input power 200 flows back to the junction 151, as described in greater detail below.

The first and second portions of input power 200 flowing from the fourth gearset 134 to the junction 157 are designated input power 204 (see the plus-sign arrows) as shown in FIG. 10. Input power 204 flows from the fourth gearset 132 directly to the junction 157, and input power 204 also flows from the fourth gearset 132 to the junction 157 through the junctions 152, 153, 154, 155, the third gearset 130, and the variator bypass clutch 124. Input power 200 is thereby reconstituted at the junction 157 as indicated above.

Recirculated power 201 (designated by the dotted arrows) is recirculated from the first gearset 126 back to the junction 151 as shown in FIG. 10. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows directly to the junction 157 in parallel with input power 204 and also to the junction 157 through the junctions 152, 153, 154, the third gearset 130, and the variator bypass clutch 124 in parallel with input power 204. Like input power 200, recirculated power 201 is reconstituted at the junction 157, and recirculated power 201 flows thereafter from the junction 157 to the first gearset 126 through the second clutch 118, the second gearset 128, and the junctions 158, 161, 159 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 10. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Turning now to the "Sync 2-3" mode of table 192, power flows from the input shaft 110 to the output shaft 112 of the transmission 104 as shown in FIG. 11. Input power 200 (designated by the solid arrows) flows from the input shaft 110 to the junction 151 and thereafter to the fourth gearset 132 as shown in FIG. 11. Input power 200 transmitted to the fourth gearset 132 is modified by the "mixing" gearset 132 such that a first portion of the input power 200 is transmitted to the junction 161 through the third clutch 120 and a second portion of the input power 200 is transmitted to the junction 161 through the second clutch 118. As such, input power 200 is reconstituted at the junction 161, and input power 200 is transmitted thereafter from the junction 161 to the first gearset 126 through the junction 159. Some of the input power 200 that is output from the first gearset 126 flows to the output shaft 112, and some of the input power 200 flows back to the junction 151, as described in greater detail below.

The first and second portions of input power 200 flowing from the fourth gearset 132 to the junction 161 are designated input power 204 (see the plus-sign arrows) as shown in FIG. 11. Input power 204 flows from the fourth gearset 132 to the junction 161 through the third clutch 120 and the junctions 152, 156, and input power 204 also flows from the fourth gearset 132 to the junction 161 through the second clutch 118, the second gearset 128, and the junctions 157, 158. Input power 200 is thereby reconstituted at the junction 161 as indicated above.

Recirculated power 201 (designated by the dotted arrows) is recirculated from the first gearset 126 back to the junction 151 as shown in FIG. 11. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows to the junction 161 through the third clutch 120 and the junctions 152, 156 in parallel with input power 204 and also to the junction 161 through the second clutch 118, the second gearset 128, and the junctions 157, 158 in parallel with input power 204. Like input power 200, recirculated power 201 is reconstituted at the junction 161, and recirculated power 201 flows thereafter from the junction 161 to the first gearset 126 through the junction 159 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 11. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Turning now to "Mode 3" of table 192, power flows from the input shaft 110 to the output shaft 112 of the transmission 104 as shown in FIG. 12. Input power 200 (designated by the solid arrows) flows from the input shaft 110 to the junction 151 and thereafter to the fourth gearset 132 as shown in FIG. 12. Input power 200 transmitted to the fourth gearset 132 is modified by the "mixing" gearset 132 such that a first portion of the input power 200 is transmitted directly to the junction 152 and a second portion of the input power 200 is transmitted to the junction 152 through the variator 114. As such, input power 200 is reconstituted at the junction 152, and input power 200 is transmitted thereafter from the junction 152 to the first gearset 126 through the third clutch 120 and the junctions 156, 161, 159. Some of the input power 200 that is output from the first gearset 126 flows to the output shaft 112, and some of the input power 200 flows back to the junction 151, as described in greater detail below.

The first and second portions of input power 200 flowing from the fourth gearset 132 to the junction 152 are designated input power 204 (see the plus-sign arrows) as shown in FIG. 12. Input power 204 flows from the fourth gearset 132 directly to the junction 152, and input power 204 also flows from the fourth gearset 132 to the junction 152 through the junctions 157, 155, 154, 153, the third gearset 130, and the variator 114. Input power 200 is thereby reconstituted at the junction 152 as indicated above.

Recirculated power 201 (designated by the dotted arrows) is recirculated from the first gearset 126 back to the junction 151 as shown in FIG. 12. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows directly to the junction 152 in parallel with input power 204 and also to the junction 152 through the junctions 157, 155, 154, 153, the third gearset 130, and the variator 114 in parallel with input power 204. Like input power 200, recirculated power 201 is reconstituted at the junction 152, and recirculated power 201 flows thereafter from the junction 152 to the first gearset 126 through the third clutch 120 and the junctions 156, 159, 161 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 12. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Figure 13:
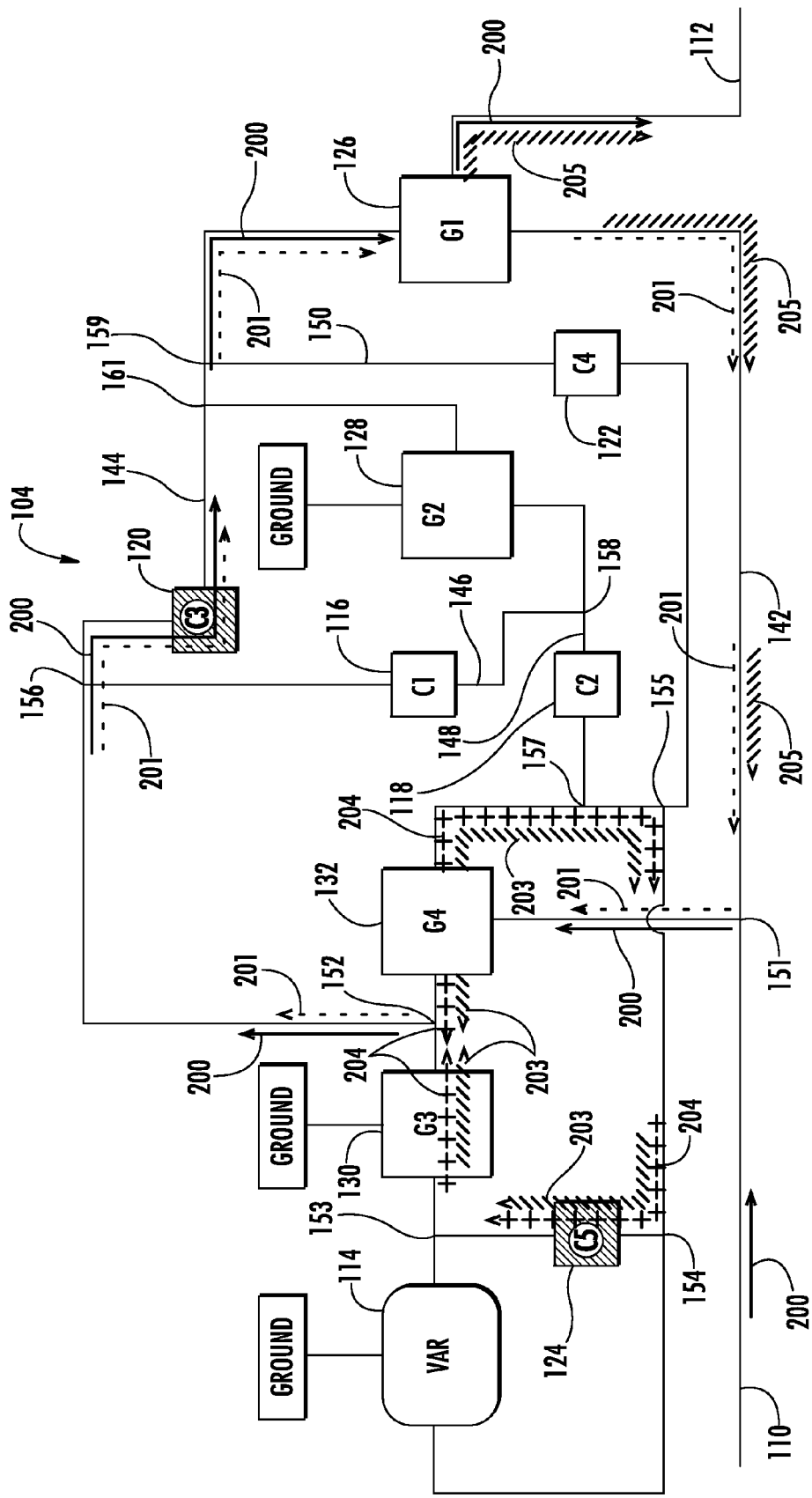
FIG. 13 is a block diagrammatic view of the infinitely variable transmission of FIG. 3 showing power flow therethrough in a third variator bypass operating mode.

Turning now to the "Bypass 3" mode of table 192, power flows from the input shaft 110 to the output shaft 112 of the transmission 104 as shown in FIG. 13. Input power 200 (designated by the solid arrows) flows from the input shaft 110 to the junction 151 and thereafter to the fourth gearset 132 as shown in FIG. 13. Input power 200 transmitted to the fourth gearset 132 is modified by the "mixing" gearset 132 such that a first portion of the input power 200 is transmitted directly to the junction 152 and a second portion of the input power 200 is transmitted to the junction 152 through the variator bypass clutch 124. As such, input power 200 is reconstituted at the junction 152, and input power 200 is transmitted thereafter from the junction 152 to the first gearset 126 through the third clutch 120 and the junctions 156, 161, 159. Some of the input power 200 that is output from the first gearset 126 flows to the output shaft 112, and some of the input power 200 flows back to the junction 151, as described in greater detail below.

The first and second portions of input power 200 flowing from the fourth gearset 132 to the junction 152 are designated input power 204 (see the plus-sign arrows) as shown in FIG. 13. Input power 204 flows from the fourth gearset 132 directly to the junction 152, and input power 204 also flows from the fourth gearset 132 to the junction 152 through the junctions 157, 155, 154, 153, the third gearset 130, and the variator bypass clutch 124. Input power 200 is thereby reconstituted at the junction 152 as indicated above.

Recirculated power 201 (designated by the dotted arrows) is recirculated from the first gearset 126 back to the junction 151 as shown in FIG. 13. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows directly to the junction 152 in parallel with input power 204 and also to the junction 152 through the junctions 157, 155, 154, 153, the third gearset 130, and the variator bypass clutch 124 in parallel with input power 204. Like input power 200, recirculated power 201 is reconstituted at the junction 152, and recirculated power 201 flows thereafter from the junction 152 to the first gearset 126 through the third clutch 120 and the junctions 156, 159, 161 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined into split power 205 (designated by the backslashed arrows), which is transmitted to the output shaft 112 and back to the junction 151, as shown in FIG. 13. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Turning now to the "Sync 3-4" mode of table 192, power flows from the input shaft 110 to the output shaft 112 of the transmission 104 as shown in FIG. 14. Input power 200 (designated by the solid arrows) flows from the input shaft 110 to the junction 151 and thereafter to the fourth gearset 132 as shown in FIG. 14. Input power 200 transmitted to the fourth gearset 132 is modified by the "mixing" gearset 132 such that a first portion of the input power 200 is transmitted to the junction 159 through the third clutch 120 and a second portion of the input power 200 is transmitted to the junction 159 through the fourth clutch 122. As such, input power 200 is reconstituted at the junction 159, and input power 200 is transmitted thereafter from the junction 159 to the first gearset 126. Some of the input power 200 that is output from the first gearset 126 flows to the output shaft 112, and some of the input power 200 flows back to the junction 151, as described in greater detail below.

The first and second portions of input power 200 flowing from the fourth gearset 132 to the junction 159 are designated input power 204 (see the plus-sign arrows) as shown in FIG. 14. Input power 204 flows from the fourth gearset 132 to the junction 159 through the third clutch 120 and the junctions 152, 156, 161, and input power 204 also flows from the fourth gearset 132 to the junction 159 through the fourth clutch 122 and the junctions 157, 155. Input power 200 is thereby reconstituted at the junction 159 as indicated above.

Recirculated power 201 (designated by the dotted arrows) is recirculated from the first gearset 126 back to the junction 151 as shown in FIG. 14. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows to the junction 159 through the third clutch 120 and the junctions 152, 156, 161 in parallel with input power 204 and also to the junction 159 through the fourth clutch 122 and the junctions 157, 155 in parallel with input power 204. Like input power 200, recirculated power 201 is reconstituted at the junction 159, and recirculated power 201 flows thereafter from the junction 159 to the first gearset 126 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 14. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Turning now to "Mode 4" of table 192, power flows from the input shaft 110 to the output shaft 112 of the transmission 104 as shown in FIG. 15. Input power 200 (designated by the solid arrows) flows from the input shaft 110 to the junction 151 and thereafter to the fourth gearset 132 as shown in FIG. 15. Input power 200 transmitted to the fourth gearset 132 is modified by the "mixing" gearset 132 such that a first portion of the input power 200 is transmitted to the junction 155 through the junction 157 and a second portion of the input power 200 is transmitted to the junction 155 through the variator 114. As such, input power 200 is reconstituted at the junction 155, and input power 200 is transmitted thereafter from the junction 155 to the first gearset 126 through the fourth clutch 122 and the junction 159. Some of the input power 200 that is output from the first gearset 126 flows to the output shaft 112, and some of the input power 200 flows back to the junction 151, as described in greater detail below.

The first and second portions of input power 200 flowing from the fourth gearset 134 to the junction 155 are designated input power 204 (see the plus-sign arrows) as shown in FIG. 15. Input power 204 flows from the fourth gearset 132 to the junction 155 through the junction 157, and input power 204 also flows from the fourth gearset 132 to the junction 155 through the junctions 152, 153, 154, the third gearset 130, and the variator 114. Input power 200 is thereby reconstituted at the junction 155 as indicated above.

Recirculated power 201 (designated by the dotted arrows) is recirculated from the first gearset 126 back to the junction 151 as shown in FIG. 15. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows to the junction 155 through the junction 157 in parallel with input power 204 and also to the junction 155 through the junctions 152, 153, 154, the third gearset 130, and the variator 114 in parallel with input power 204. Like input power 200, recirculated power 201 is reconstituted at the junction 155, and recirculated power 201 flows thereafter from the junction 155 to the first gearset 126 through the fourth clutch 122 and the junction 159 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 15. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

Figure 16:
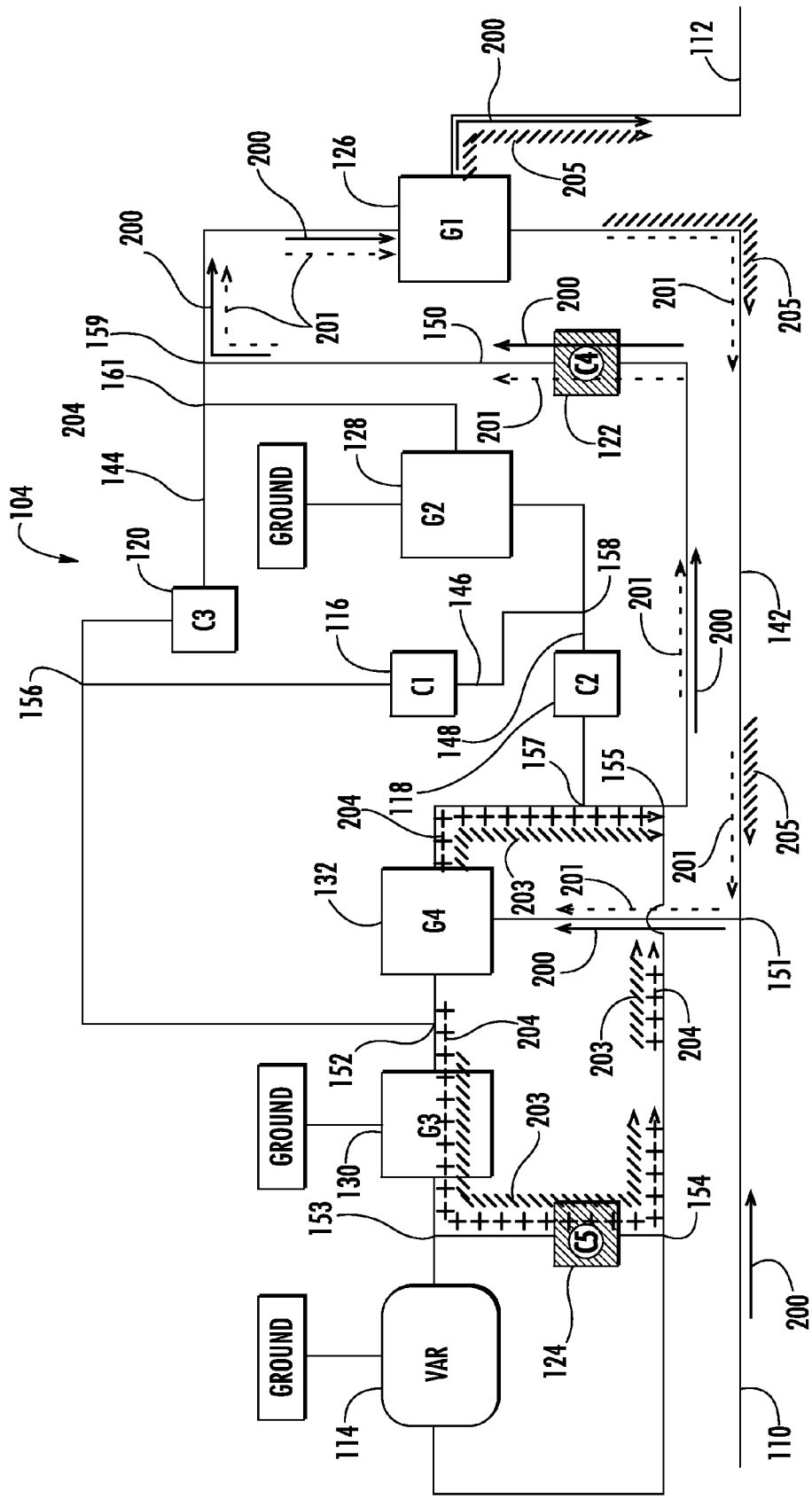
FIG. 16 is a block diagrammatic view of the infinitely variable transmission of FIG. 3 showing power flow therethrough in a fourth variator bypass operating mode.

Turning now to the "Bypass 4" mode of table 192, power flows from the input shaft 110 to the output shaft 112 of the transmission 104 as shown in FIG. 16. Input power 200

(designated by the solid arrows) flows from the input shaft 110 to the junction 151 and thereafter to the fourth gearset 132 as shown in FIG. 16. Input power 200 transmitted to the fourth gearset 132 is modified by the "mixing" gearset 132 such that a first portion of the input power 200 is transmitted to the junction 155 through the junction 157 and a second portion of the input power 200 is transmitted to the junction 155 through the variator bypass clutch 124. As such, input power 200 is reconstituted at the junction 155, and input power 200 is transmitted thereafter from the junction 155 to the first gearset 126 through the fourth clutch 122 and the junction 159. Some of the input power 200 that is output from the first gearset 126 flows to the output shaft 112, and some of the input power 200 flows back to the junction 151, as described in greater detail below.

The first and second portions of input power 200 flowing from the fourth gearset 134 to the junction 155 are designated input power 204 (see the plus-sign arrows) as shown in FIG. 16. Input power 204 flows from the fourth gearset 132 to the junction 155 through the junction 157, and input power 204 also flows from the fourth gearset 132 to the junction 155 through the junctions 152, 153, 154, the third gearset 130, and the variator bypass clutch 124. Input power 200 is thereby reconstituted at the junction 155 as indicated above.

Recirculated power 201 (designated by the dotted arrows) is recirculated from the first gearset 126 back to the junction 151 as shown in FIG. 16. At the junction 151, recirculated power 201 is combined with input power 200 received from the input shaft 110. Recirculated power 201 then flows in parallel with input power 200 from the junction 151 to the fourth gearset 132 where the recirculated power 201 is modified by the "mixing" gearset 132 so that the recirculated power 201 becomes split recirculated power 203 (designated by the slashed arrows). From the fourth gearset 132, split recirculated power 203 flows to the junction 155 through the junction 157 in parallel with input power 204 and also to the junction 155 through the junctions 152, 153, 154, the third gearset 130, and the variator bypass clutch 124 in parallel with input power 204. Like input power 200, recirculated power 201 is reconstituted at the junction 155, and recirculated power 201 flows thereafter from the junction 155 to the first gearset 126 through the fourth clutch 122 and the junction 159 in identical fashion to input power 200. Hereafter, the combination of input power 200 and recirculated power 201 is referred to as "combined power" and is understood to be greater than input power 200 and recirculated power 201.

The "mixing" gearset 126 breaks up the combined power into split power 205 (designated by the backslashed arrows), which is transmitted to the output shaft 112 and back to the junction 151, as shown in FIG. 16. In this way, some split power 205 flows from the first gearset 126 to the output shaft 112 (like input power 200), thereby adding to the power transmitted to the output shaft 112. Some split power 205 also flows from the first gearset 126 to the junction 151 and, like recirculated power 201, back through the first gearset 126 in parallel with input power 200.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A transmission comprising:
an input shaft configured to receive torque from a drive unit,
an output shaft configured to transmit torque to a load,
four planetary gearsets arranged between the input shaft and the output shaft,
a variable-ratio unit arranged between the input shaft and the output shaft, and
at least four clutches arranged between the input shaft and the output shaft, the at least four clutches being selectively engageable in combination with one another to select one of at least four operating modes,
wherein the at least four clutches include no more than four clutches arranged between the input shaft and the output shaft.

2. The transmission of claim 1,
wherein the at least four operating modes include no more than four operating modes.

3. The transmission of claim 2, wherein (i) the transmission is configured to receive a first plurality of input speeds at the input shaft and provide a second plurality of output speeds at the output shaft, and (ii) the four operating modes include a first mode in which one of the second plurality of output speeds is equal to zero for the first plurality of input speeds and a second mode in which one of the second plurality of output speeds is equal to zero for the first plurality of input speeds.

4. The transmission of claim 3, wherein the transmission is configured to provide (i) a range of negative speed ratios between the input shaft and the output shaft in the first mode, and (ii) a range of positive speed ratios between the input shaft and the output shaft in the second mode.

5. The transmission of claim 1, wherein the at least four operating modes include no more than seven operating modes.

6. The transmission of claim 1, further comprising
a housing, wherein
(i) the four planetary gearsets comprise a first planetary gearset coupled to the input shaft and a second planetary gearset coupled to the housing, and
(ii) the at least four clutches include a first clutch engageable to selectively couple a first element of the first planetary gearset to a first element of the second planetary gearset.

7. The transmission of claim 6, wherein the at least four clutches include a second clutch engageable to selectively couple the first element of the first planetary gearset to a second element of the second planetary gearset.

8. The transmission of claim 7, wherein
(i) the four planetary gearsets comprise a third planetary gearset coupled to the housing,
(ii) the at least four clutches include a third clutch engageable to selectively couple a first element of the third planetary gearset to the first element of the second planetary gearset, and
(iii) the at least four clutches include a fourth clutch engageable to selectively couple the first element of the third planetary gearset to the second element of the second planetary gearset.

9. A transmission comprising:
a housing,
an input shaft configured to receive torque from a drive unit,
an output shaft configured to transmit torque to a load,
a variable-ratio unit arranged between the input shaft and the output shaft, the variable-ratio unit being configured to output torque from an input of the variable-ratio unit to an output of the variable-ratio unit, four planetary gearsets arranged between the input shaft and the output shaft, the at least four planetary gearsets including
(i) a first planetary gearset coupled to the input shaft and the variable-ratio unit and
(ii) a second planetary gearset coupled to the first planetary gearset, the variable-ratio unit, and the housing, and at least four clutches arranged between the input shaft and the output shaft, the at least four clutches being selectively engageable in combination with one another to select one of at least four operating modes, wherein the transmission is operable to engage only one of the at least four clutches in each of the at least four operating modes.

10. The transmission of claim 9, wherein each of the first and second planetary gearsets includes an idler gear.

11. The transmission of claim 9, wherein (i) a ring gear of the first planetary gearset is coupled to the input shaft, and (ii) a carrier of the first planetary gearset is coupled to the input of the variable-ratio unit.

12. The transmission of claim 9, wherein (i) a ring gear of the second planetary gearset is coupled to a sun gear of the first planetary gearset, (ii) a sun gear of the second planetary gearset is coupled to the output of the variable-ratio unit, and (iii) a carrier of the second planetary gearset is coupled to the housing.

13. The transmission of claim 9, wherein
(i) the four planetary gearsets include a third planetary gearset coupled to the housing, and
(ii) the at least four clutches include a first clutch engageable to selectively couple a carrier of the first planetary gearset to a carrier of the third planetary gearset.

14. The transmission of claim 13, wherein the at least four clutches include a second clutch engageable to selectively couple the carrier of the first planetary gearset to a sun gear of the third planetary gearset.

15. The transmission of claim 14, wherein the at least four clutches include a third clutch engageable to selectively couple a ring gear of the second planetary gearset to the carrier of the third planetary gearset.

16. The transmission of claim 15, wherein the at least four clutches include a fourth clutch engageable to selectively couple the ring gear of the second planetary gearset to the sun gear of the third planetary gearset.

17. A transmission comprising:

a housing, an input shaft configured to receive torque from a drive unit, an output shaft configured to transmit torque to a load, a variable-ratio unit arranged between the input shaft and the output shaft, four planetary gearsets arranged between the input shaft and the output shaft, the at least four planetary gearsets including
(i) a first planetary gearset coupled to the input shaft and the variable-ratio unit and
(ii) a second planetary gearset coupled to the first planetary gearset, the variable-ratio unit, and the housing, and at least four clutches arranged between the input shaft and the output shaft, the at least four clutches selectively engageable in combination with one another to select one of at least four operating modes, the at least four clutches including
(i) a first pair of clutches engageable in combination with one another to couple a first element of the second planetary gearset to a first element of the first planetary gearset in one of the at least four operating modes and
(ii) a second pair of clutches engageable in combination with one another to couple the first element of the second planetary gearset to the first element of the first planetary gearset in another of the at least four operating modes.

\* \* \* \* \*